(12) United States Patent
Maruyama et al.

(10) Patent No.: US 8,310,437 B2
(45) Date of Patent: Nov. 13, 2012

(54) BACKLIGHT DEVICE AND DISPLAY DEVICE

(75) Inventors: Junichi Maruyama, Yokohama (JP);
Koji Hosogi, Hiratsuka (JP); Yoshihisa Ooishi, Yokohama (JP); Misa Owa, Kokubunji (JP); Kikuo Ono, Mobara (JP)

(73) Assignees: Hitachi Displays, Ltd., Chiba (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 469 days.

(21) Appl. No.: 12/625,655

(22) Filed: Nov. 25, 2009

(65) Prior Publication Data
US 2010/0134406 A1 Jun. 3, 2010

(30) Foreign Application Priority Data

Nov. 28, 2008 (JP) .................................. 2008-304118
Sep. 16, 2009 (JP) .................................. 2009-214603

(51) Int. Cl.
*G09G 3/36* (2006.01)

(52) U.S. Cl. ............ 345/102; 345/82; 345/83; 345/204; 315/169.1; 315/324; 362/249.02

(58) Field of Classification Search .................. 345/82, 345/83, 102, 204; 315/169.1, 324; 362/249.02
See application file for complete search history.

(56) References Cited

U.S. PATENT DOCUMENTS

| 7,982,709 | B2* | 7/2011 | Sekiguchi et al. | 345/102 |
| 2006/0232544 | A1* | 10/2006 | Sakashita | 345/102 |
| 2007/0097288 | A1 | 5/2007 | Jang | |
| 2008/0174544 | A1* | 7/2008 | Ueda et al. | 345/102 |
| 2008/0238859 | A1* | 10/2008 | Kim et al. | 345/102 |
| 2009/0195182 | A1 | 8/2009 | Ezaki | |
| 2009/0303167 | A1* | 12/2009 | Mori et al. | 345/102 |
| 2010/0083046 | A1* | 4/2010 | Tanaka | 714/37 |

FOREIGN PATENT DOCUMENTS

| JP | 2001-142409 | 5/2001 |
| JP | 2002-182182 | 6/2002 |
| JP | 2006-352011 | 12/2006 |
| JP | 2007-123233 | 5/2007 |

* cited by examiner

*Primary Examiner* — Wayne Young
*Assistant Examiner* — Linh Hoffner
(74) *Attorney, Agent, or Firm* — Antonelli, Terry, Stout & Kraus, LLP.

(57) ABSTRACT

The backlight device includes: a backlight including a plurality of light sources; and a backlight control part. The backlight includes a plurality of divided areas, and light sources disposed in each of the plurality of divided areas are chain-connected. The backlight control part includes at least one backlight control unit for controlling turning on and off of the backlight which includes the plurality of divided areas, with respect to the each divided area. The backlight control unit includes a selection unit for selecting one of divided areas, at least one backlight drive path. The selection unit selects the one of divided areas in a time division manner, and the light sources of the one of divided areas are driven by sharing the at least one backlight drive path in common.

9 Claims, 14 Drawing Sheets

BACKLIGHT DEVICE AND DISPLAY DEVICE

CROSS-REFERENCE TO RELATED APPLICATIONS

The present application claims priority from Japanese applications JP2008-304118 filed on Nov. 28, 2008 and JP2009-214603 filed on Sep. 16, 2009, the contents of which are hereby incorporated by reference into this applications.

BACKGROUND OF THE INVENTION

1. Field of the Invention

The present invention relates to a backlight device and a display device, and more particularly, to a display device including a display panel for displaying a video image through adjustment of a transmittance of light from a light source and a backlight for illuminating the display panel.

2. Description of the Related Art

In recent years, the thickness of a display such as a display device using liquid crystal has been greatly reduced. A liquid crystal display device mainly includes three modules. A first one of the modules includes a liquid crystal display panel module in which liquid crystal is enclosed between two glass substrates, and a voltage is supplied to the liquid crystal to change the orientation of the liquid crystal, to thereby change the light transmittance (modulation degree of light passing through the liquid crystal). In the liquid crystal display panel module, liquid crystal cells constituting pixels are arranged two-dimensionally, and the liquid crystal cells are sequentially controlled, to thereby attain two-dimensional control of the light transmittance. A second one of the modules includes a backlight module, which is provided in the rear of the liquid crystal display panel module so as to be used as a light source and emits illumination light. The illumination light is supplied from the rear of the liquid crystal display panel module, and hence the liquid crystal display device produces displays. A third one of the modules includes a control part, which is a module for controlling the liquid crystal display panel module and the backlight module.

Conventionally, a cold cathode fluorescent lamp (CCFL) has been widely used as a light source for the backlight of a liquid crystal panel. In recent years, however, a light emitting diode (LED) instead of the CCFL is also used as the light source for the backlight. It is easy to perform on-off control on the light emitting period of the LED, and the light emission amount thereof is also easy to control through control of a current amount. Hence, the LED is lower in power consumption as compared with the CCFL. Further, the LED is physically smaller in configuration than the CCFL, which may reduce an area for the light source for the backlight formed of one LED device.

As a technology of using a smaller light source area, JP 2001-142409 A discloses a technology which relates to an area light modulation technology using an LED. According to the area light modulation technology, LEDs which serve as light sources to emit illumination light for irradiating a liquid crystal panel are provided at least one by one for a plurality of divided areas, and an LED control circuit controls, in accordance with a video signal, driving of LEDs on a backlight panel in the unit of the divided areas so that only picture areas requiring illumination light may be at least irradiated with illumination light, without irradiating with the illumination light picture areas which do not need to be illuminated basically, to thereby reduce power consumption necessary for illumination.

There is a connection method for use in a case of using LEDs as the backlight, as disclosed in JP 2006-352011A, in which a constant current source and a switch are connected in series for one LED chain, and a constant current is caused to flow through the LED chain by turning on and off the switch, to thereby turns on and off the LEDs.

Further, JP 2002-182182 A and JP 2007-123233 A disclose a scanning backlight (backlight scrolling) driving technology. According to the scanning backlight driving technology, a screen is divided into a plurality of areas in a longitudinal direction, and the backlight is sequentially driven at predetermined intervals, to thereby produce an effect of reducing a motion blur.

The area light modulation technology disclosed in JP 2001-142409 A may be implemented with relative ease in a backlight which has LEDs arranged in a grid pattern. Further, in order to implement the combination of the scanning backlight driving technology disclosed in JP 2002-182182 A and JP 2007-123233 A and the area light modulation technology, the light sources for the backlight are distributed to be arranged in a grid pattern in the unit of a plurality of areas, and LEDs connected to one area are controlled as one LED chain, to thereby allow simultaneous control of the area light modulation and the scanning backlight driving.

However, in a case where the light sources for the backlight such as LEDs are distributed to be arranged for a plurality of areas, each of the divided areas requires an LED chain as a dedicated control chain for area control, and when the number of divided areas increases, the control module such as a constant current source is increased in size while the number of control signals between the control module and the backlight module increases. Further, along with an increase in number of LED chains, it is necessary to provide a plurality of the constant current sources, which leads to a problem of a large heating value.

SUMMARY OF THE INVENTION

The present invention has been made to solve the above-mentioned problems, and it is therefore an object of the invention to provide a backlight device and a display device which are capable of reducing circuit sizes for a control part and a backlight drive path for attaining an area light modulation function and a scanning backlight function.

Another object of the present invention is to provide a backlight device and a display device which are capable of being reduced in heating value.

The other objects of the present invention become apparent from the entire description of the specification.

(1) In order to achieve the above-mentioned objects, a backlight device according to the present invention includes: a backlight including a plurality of light sources; and a backlight control part for controlling the backlight, in which: the backlight includes a plurality of divided areas, and light sources disposed in each of the plurality of divided areas are chain-connected; the backlight control part includes at least one backlight control means for controlling turning on and off of the backlight which includes the plurality of divided areas, with respect to the each of the plurality of divided areas; the at least one backlight control means includes: selection means for selecting one of the plurality of divided areas; and at least one backlight drive path; and the selection means selects the one of the plurality of divided areas in a time division manner, and the light sources of the one of the plurality of divided areas are driven by sharing the at least one backlight drive path in common.

(2) In order to achieve the above-mentioned objects, a display device according the present invention includes: a display panel including a plurality of pixels arrayed thereon, for controlling a light transmission amount; and the backlight control part according to the item (1) described above.

As described above, the display device is provided with the area light modulation function and the light modulation technology based on scanning backlight driving. According to the area light modulation function, the backlight has the plurality of divided areas, and the luminance of the each of the plurality of areas of the backlight is individually controlled according to a two-dimensional feature of input video data. The display device includes a plurality of the control parts for controlling the areas, the means for controlling the areas in the time division manner, and the means for allowing the control part and the backlight drive path to be shared for use.

According to the present invention, circuit sizes for the control part and the backlight drive path for attaining the area light modulation function and the scanning backlight driving function in the display device are reduced to smaller values. As a result, the heating value of the control part for implementing the area light modulation function and the scanning backlight function is reduced, and the backlight device and the display device are provided at low cost.

Any other effect of the present invention becomes apparent from the entire description of the specification.

DETAILED DESCRIPTION OF THE INVENTION

Hereinbelow, a description is given of embodiments to which the present invention is applied, with reference to the accompanying drawings. In the following description, the same constituent elements are denoted by the same reference symbols, and repeated descriptions thereof are omitted.

[First Embodiment]

Figure 1:
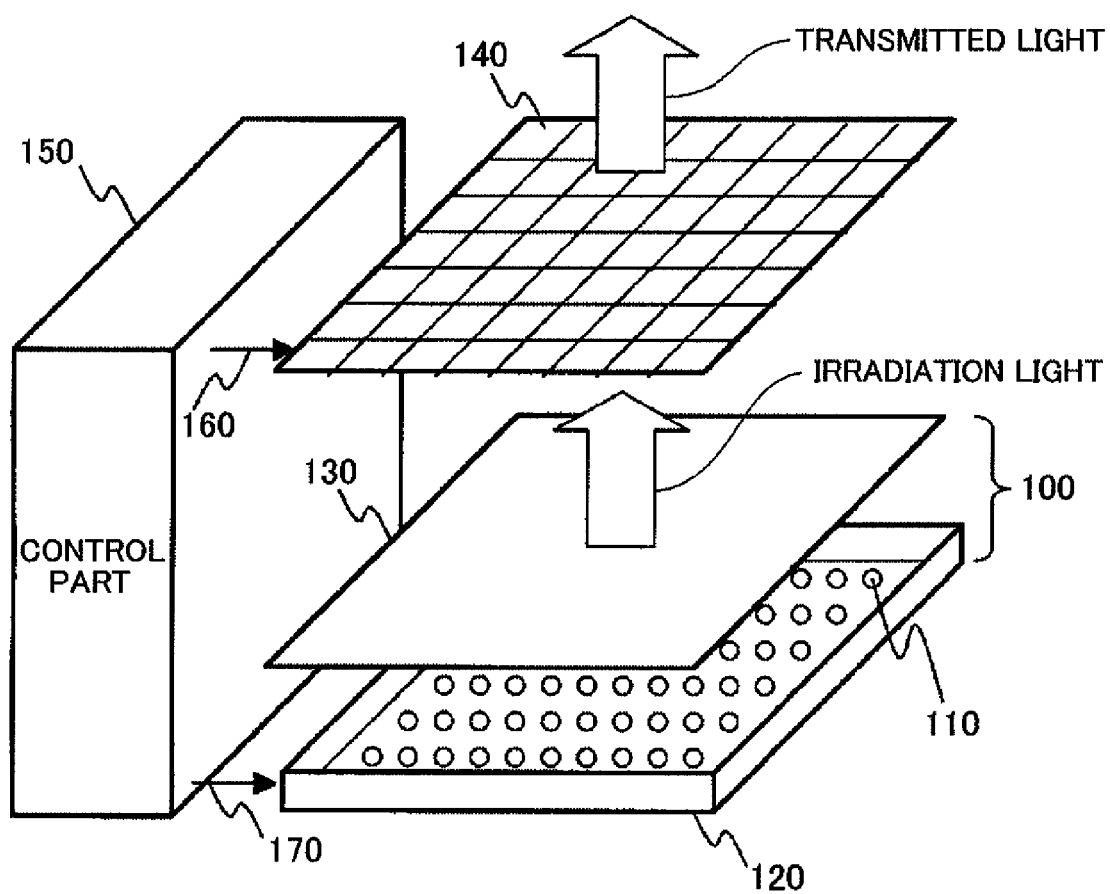
FIG. 1 is an exploded perspective view for illustrating an overview of a configuration of a display device according to a first embodiment of the present invention.

FIG. 1 is an exploded perspective view for illustrating an overview of a configuration of a display device according to a first embodiment of the present invention, in which each member is separately illustrated for illustrating constituent members of the display device of the first embodiment. The display device includes a display device such as a television receiver, which is typified by a liquid crystal display device provided with a function of receiving various video data as inputs and displaying the data.

As illustrated in FIG. 1, the display device mainly includes three constituent elements, that is, a backlight module 100, a display panel 140, and a control part 150 for controlling the backlight module 100 and the display panel 140. It should be noted that the present invention mainly refers to control on the backlight module 100, and therefore the control part 150 is described as a backlight control part 150, despite that the backlight control part 150 also controls the display panel 140.

The display panel 140 includes, for example, a known liquid crystal panel. The display panel 140 includes a plurality of liquid crystal elements as pixels (display units) arranged in a matrix. In the display panel 140, a transmittance of each of the pixels is individually controlled according to a liquid crystal panel control signal 160 supplied from the backlight control part 150.

The backlight module 100 has a function of illuminating the display panel 140, and includes a plurality of light sources 110, a frame 120, an optical member 130, and the like. The backlight module 100 is controlled based on a backlight control signal 170 input from the backlight control part 150. In this embodiment, a description is given of a case of employing, for example, light emitting diodes (LEDs) as the light sources 110. However, the light source 110 is not limited to an LED, and may include another light emitting element such as an organic electroluminescence (EL) device. The light sources 110 are arranged at appropriate intervals on the frame 120. The optical member 130 may include, for example, an optical member such as a diffusion sheet for uniformalizing the intensity of light emitted from the light sources 110 and a luminance improving film for improving light extraction efficiency. The display panel 140 displays an image based on display data 160 created by the backlight control part 150.

Further, in the display device according to the first embodiment to which the present invention is applied, light emitted from the backlight module 100 passes in part through the pixels of the display panel 140, and a group of the transmitted light eventually forms a display video image in the display device. In other words, the display intensity of each of the pixels of the display device is eventually determined by multiplying the transmittance of each of the pixels of the display panel by the luminance (intensity of irradiation light) in a region of the backlight, the region corresponding to the pixel.

Figure 2:
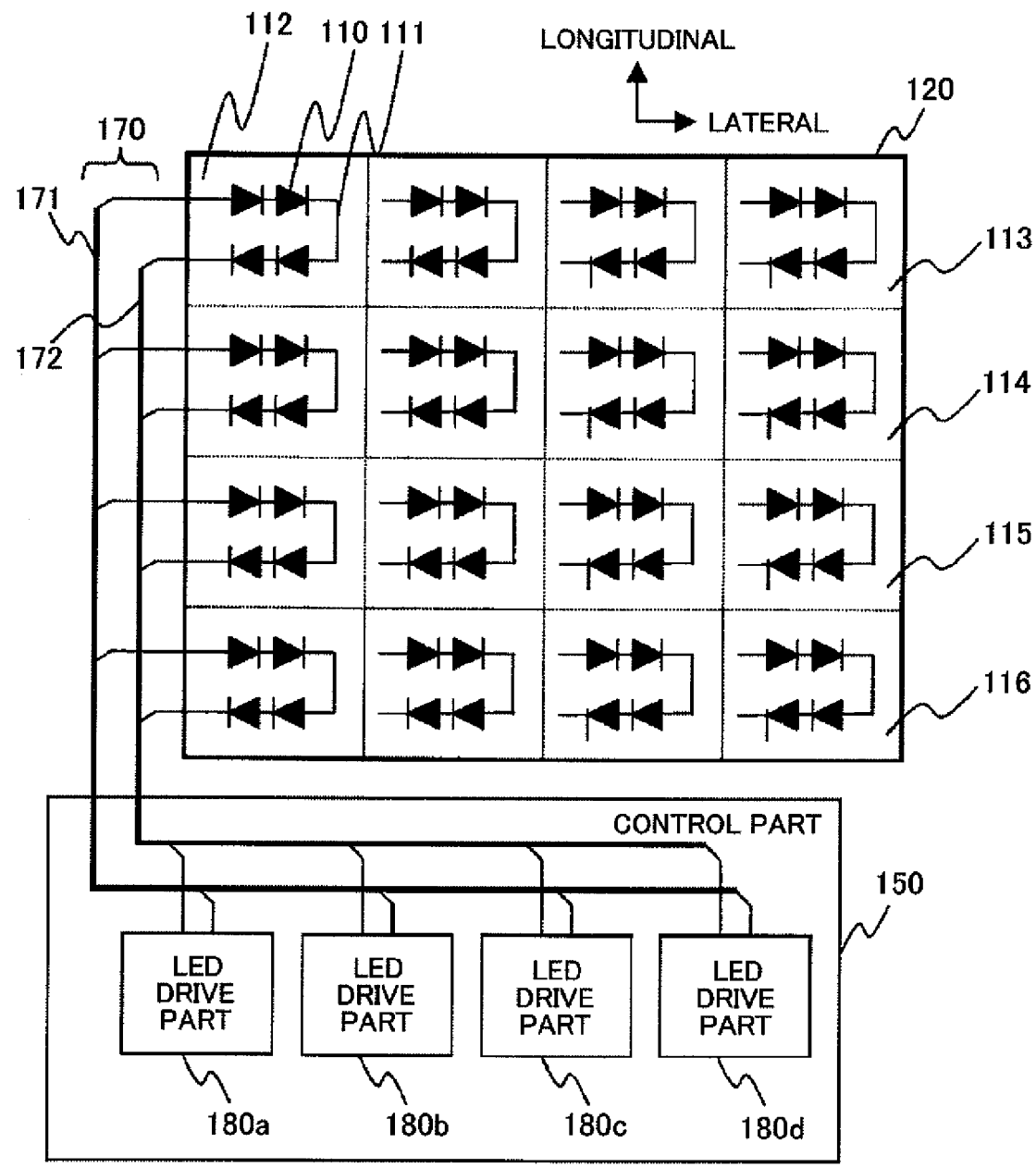
FIG. 2 is a diagram for illustrating an overview of a configuration of a backlight module according to the first embodiment of the present invention, which includes a frame, a plurality of light sources, and a backlight control part.

FIG. 2 is a diagram for illustrating an overview of a configuration of the backlight module 100 according to the first embodiment of the present invention, which includes the frame 120, the plurality of light sources 110, and the backlight control part 150. The display device according to this embodiment is described by taking, as an example, a case where the screen is divided into sixteen divided areas by dividing the length and the width each into four, for implementing the area light modulation and scanning backlight modulation. However, the number of the divided areas is not limited to sixteen, and may be any other number.

Further, a description is given of the case of employing the light emitting diodes (LEDs) as the light sources 110 in this embodiment as described above.

As illustrated in FIG. 2, in the display device of this embodiment, one divided area 112 includes four LED light sources 110 as the plurality of LED light sources 110, and the four LED light sources 110 are connected in series to an LED chain 111. The LED chain 111 is connected to the backlight control signal 170. Specifically, an anode side of the LED light source 110 is connected to an anode signal 171, while a cathode side of the LED light source 110 is connected to a cathode signal 172. The backlight control signal 170 according to this embodiment are connected to the sixteen divided areas 112 in total, and therefore includes a signal capable of controlling the sixteen LED chains, and hence the LEDs are controlled to be turned on and off with respect to each divided area 112.

The backlight control part 150 controls the LED chains 111, and hence includes a plurality of LED drive parts 180. In the display device according to the present invention, one LED drive part 180 is capable of controlling four LED chains in total, and hence four LED drive parts 180 control sixteen LED chains in total. Further, each LED drive part 180 is connected to, of the divided areas 112 obtained by dividing the screen into sixteen, four divided areas disposed in a longitudinal direction. For example, divided areas 113, 114, 115, and 116, which are arranged side by side in a longitudinal direction of FIG. 2, are controlled by one LED drive part 180. It should be noted that, in this embodiment, the number of the LED chains and the number of LED chains capable of being controlled by one LED drive part 180 may not be limited to the numbers described above.

Figure 3:
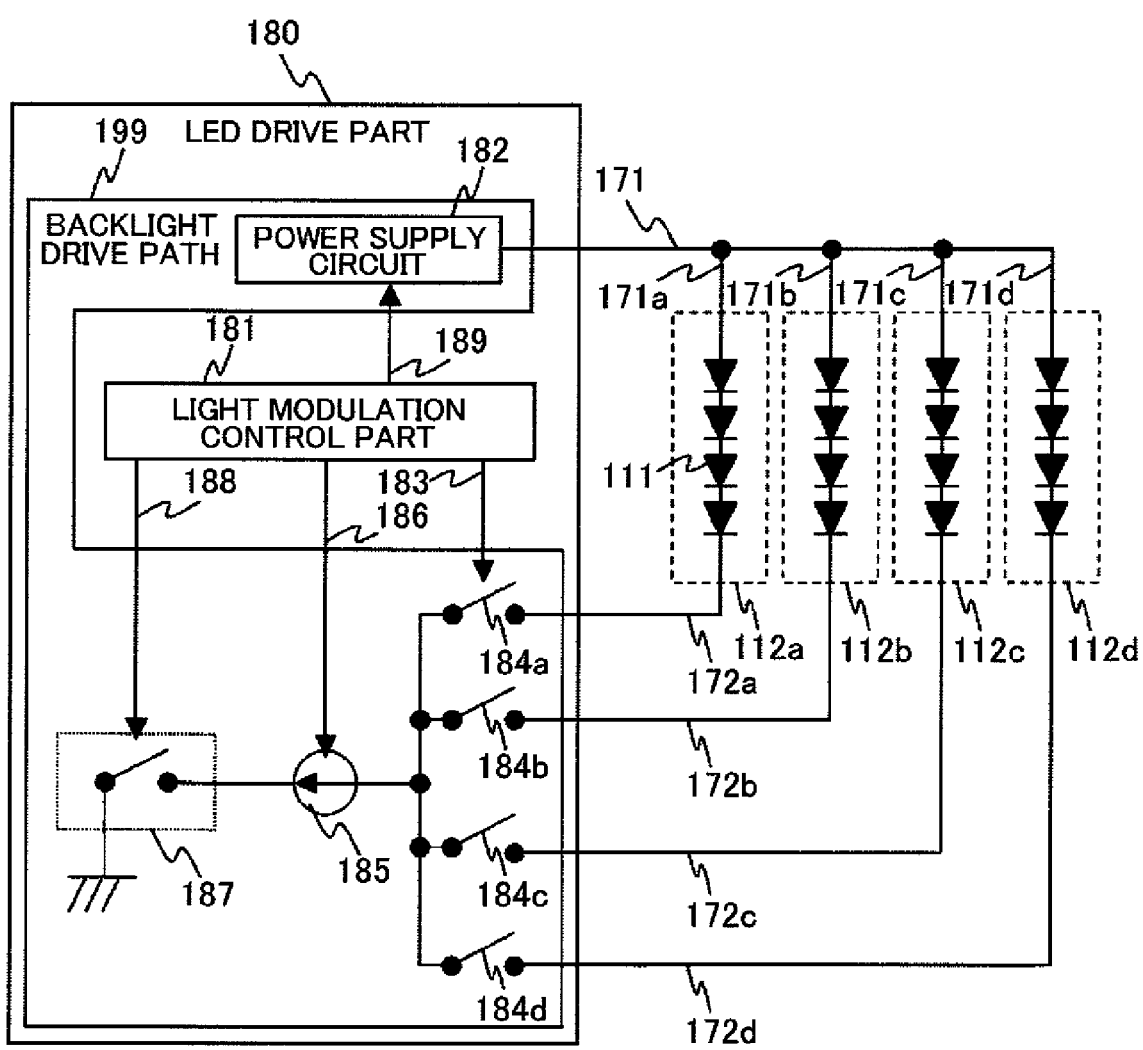
FIG. 3 is a diagram for illustrating in detail an LED drive part according to the first embodiment of the present invention.

FIG. 3 is a diagram for illustrating in detail the LED drive part 180 according to the first embodiment of the present invention. As illustrated in FIG. 3, four LED chains 112a to 112d are connected to the LED drive part 180. A power supply circuit 182 supplies each of the LED chains 112a to 112d with a voltage and a current. In this embodiment, a voltage to each of the LED chains 112a to 112d is supplied via the anode signal 171, and supplied to the LED chains 112a, 112b, 112c, and 112d from signal lines 171a to 171d, respectively. The signal transmitted through the cathode signal 172 provided on the output side of the LED chains 112a to 112d is output from each of the LED chains 112a to 112d, and input to the LED drive part 180 from each of the signal lines 172a, 172b, 172c, and 172d.

The cathode signal 170 are connected to first switches 184a, 184b, 184c, and 184d, respectively. The first switches 184a to 184d are independent of one another. Each of the first switches 184a to 184d is short-circuited so that an output therefrom is input to a constant current source 185. The first switches 184a, 184b, 184c, and 184d are controlled by an LED chain selection signal 183.

The constant current source 185 includes a known constant current source which is capable of causing a constant current to flow according to a constant current control signal 186. Further, in this embodiment, the power supply circuit 182 is also controlled by a power supply control signal 189, along with the control performed on the constant current source 185, and hence the power supply circuit 182 and the constant current source 185 may constitute one LED chain and be adjusted in current amount. An output of the constant current source 185 is connected to a second switch 187 and grounded. The second switch 187 is controlled by a pulse width modulation signal 188 for performing on-off control on the series of the LED chain from the power supply circuit 182 to the ground. Further, those control signals (the LED chain selection signal 183, the constant current control signal 186, the pulse width modulation signal 188, and the power supply control signal 189) are generated by a first light modulation control part 181 which has a function of controlling the entire LED drive part 180. It should be noted that, in this specification, of the LED drive part 180, a portion except for the first light modulation part 181 is defined as backlight drive path 199.

Figure 4:
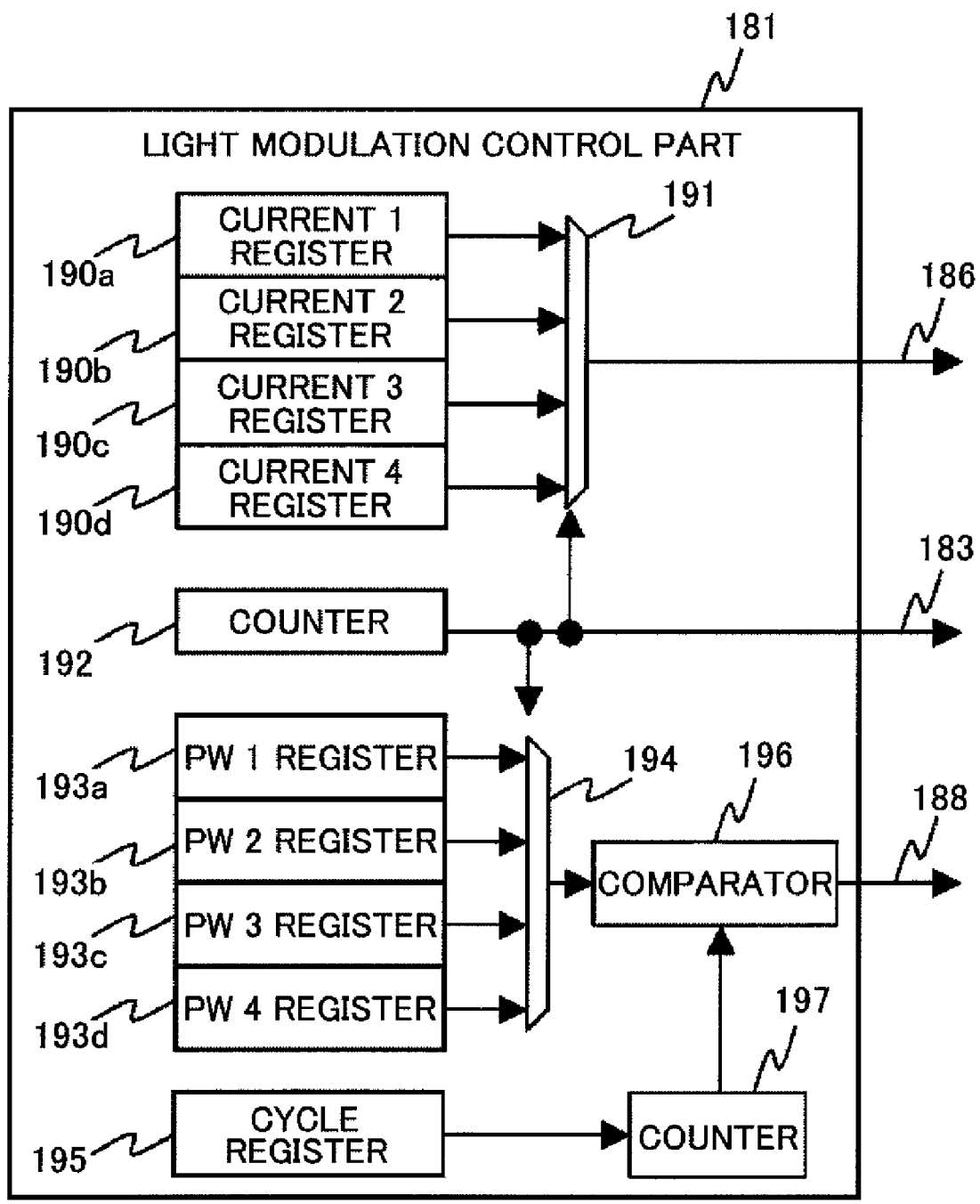
FIG. 4 is a diagram for illustrating in detail a first light modulation control part according to the first embodiment of the present invention.

FIG. 4 is a diagram for illustrating in detail the first light modulation control part 181 according to the first embodiment of the present invention.

The first light modulation part 181 performs overall control by, for example, making a selection of an LED chain for operation, controlling a current amount with respect to each LED chain, and performing pulse width modulation with respect to each LED chain. The pulse width modulation is described later in detail.

As illustrated in FIG. 4, the first light modulation control part 181 of the first embodiment includes a current 1 register 190a, a current 2 register 190b, a current 3 register 190c, a current 4 register 190d, and a selector 191, which are for designating a current amount based on a count value of the counter 192. The first light modulation control part 181 further includes a PW 1 register 193a, a PW 2 register 193b, a PW 3 register 193c, a PW 4 register 193d, a selector 194, which are for designating a pulse modulation width based on a count value of the counter 192, a cycle register 195, and a counter 197.

The selection of an LED chain is made based on the counter 192. In the case of the first embodiment, based on a counter corresponding to a 2-bit width, four LED chains including, for example, the first LED chain 112a, the second LED chain 112b, the third LED chain 112c, and the fourth LED chain 112d, are selected.

A current amount is designated for each LED chain through designation of a value stored in each of the current 1 register 190a, the current 2 register 190b, the current 3 register 190c, and the current 4 register 190d. In the first embodiment, the selector 101 selects a channel to be activated, following the designation made by the counter 192. The value selected by the selector 191 is transmitted, as the constant current control signal 186, to the constant current source 185, and also transmitted, as the power supply control signal 189, to the power supply circuit 182.

Similarly, a pulse modulation width is designated for each LED chain through designation of a value stored in each of the PW 1 register 193a, the PW 2 register 193b, PW 3 register 193c, and the PW 4 register 193d. Then, an LED chain to be activated is selected via the selector 194 following the designation made by the counter 192, and the value selected by the selector 194 is input to a comparator 196.

Here, the pulse width modulation is described. The pulse width modulation refers to a modulation method capable of specifying a duty ratio of a pulse width in a predetermined cycle. In the first embodiment, the second counter 197 counts until the value reaches a value set in the cycle register 195 for designating a cycle. The value counted by the second counter 197 is input to the comparator 196, compared with a selected PW n register value, and output as the pulse width modulation signal 188, only when the PW n register value is smaller than the count value. Based on the pulse width modulation signal 188, whether or not to activate the LED chain is controlled, that is, an on-off (turning on/turning off) control is performed.

Figure 5:
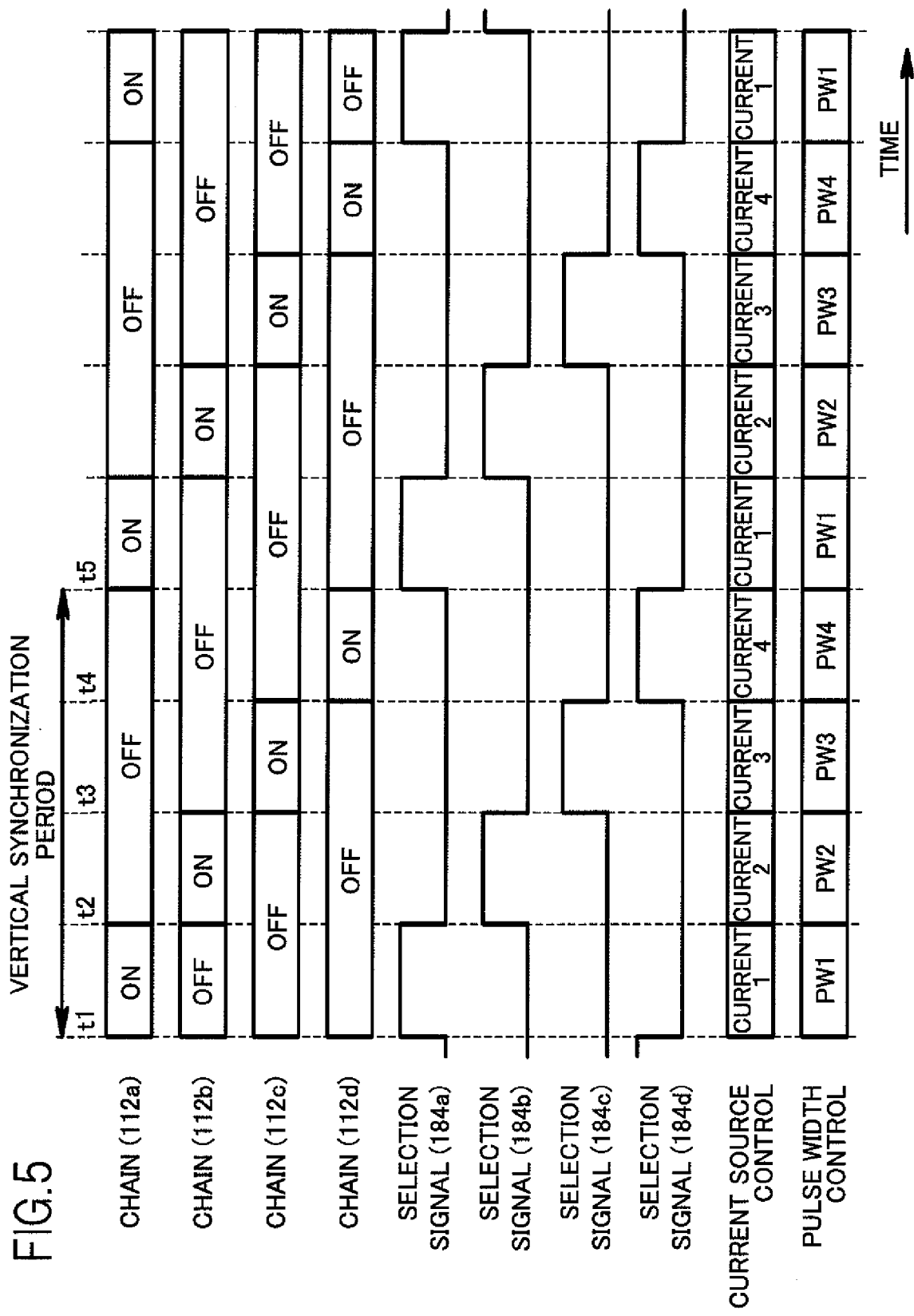
FIG. 5 is a chart for illustrating an operation of turning on and off LED chains, the operation being performed under the control of the LED drive part according to the first embodiment of the present invention.

FIG. 5 is a chart for illustrating an operation of turning on and off the LED chains, the operation being performed under the control of the LED drive part 180 according to the first embodiment of the present invention. According to FIG. 5, the four LED chains are repeatedly turned on and off in sequence in a vertical synchronization period. Further, illustrated in FIG. 5 is a lighting pattern in which a lighting period of each of the LED chains is a one-fourth of the entire period and the lighting periods do not overlap with one another.

Hereinbelow, with reference to FIG. 5, an operation of turning on and off each of the LED chains 112a, 112b, 112c, and 112d, based on the control performed by the LED drive part 180 according to the first embodiment is described. As illustrated in FIG. 5, an output of the counter 192 is used as the LED chain selection signal 183 (referred to as selection signal in FIG. 5), to sequentially control the first switches 184a to 184d, and hence only one chain of the four chains 112a to 112d is selected for each one-fourth period of the vertical synchronization period, that is, the selected chain is connected to the constant current source 185. At this time, the selector 191 and the selector 194 are also controlled based on the output from the counter 192, which enables turning-on/turning-off control for each LED chain, that is, for each divided area, in which a selection of a chain is made in synchronization with performing current source control and pulse width control corresponding to the selected chain.

Specifically, of one vertical synchronization period illustrated as a period between a time t1 and a time t5, in a period between a time t1 and a time t2, a selection signal for selecting the first switch 184a is selectable, while any other selection signal is not selectable. At this time, the current source control is performed such that a current amount (current 1) stored in the current 1 register 190a, which is associated with the chain 112a connected to the first switch 184a, is designated as the constant current source 185, and the chain 112a is driven at the current amount (current 1) thus designated. Further, the pulse width control is performed such that a register value (PW 1) stored in the PW 1 register 193a, which is associated with the chain 112a connected to the first switch 184a, is output to the comparator 196. Based on the output from the comparator 196, the on-off control is performed on the second switch 187, and the chain 112a is driven at a pulse width corresponding to the register value (PW 1) thus designated.

Similarly, in a period between the time t2 and a time t3, a selection signal for selecting the first switch 184 is selectable, while any other selection signal is not selectable. At this time, the current source control is performed such that a current amount (current 2) stored in the current 2 register 190b, which is associated with the chain 112b connected to the first switch 184a, is designated as the constant current source 185, and the chain 112b is driven at the current amount (current 2) thus designated. Further, the pulse width control is performed such that a register value (PW 2) stored in the PW 2 register 193b, which is associated with the chain 112b connected to the first switch 184b, is output to the comparator 196. Based on the output from the comparator 196, the on-off control is performed on the second switch 187, and the chain 112b is driven at a pulse width corresponding to the register value (PW 2) thus designated.

In a period between the time t3 and a time t4, a selection signal for selecting the first switch 184c is selectable, while any other selection signal is not selectable. At this time, the current source control is performed such that a current amount (current 3) stored in the current 3 register 190c, which is associated with the chain 112c connected to the first switch 184c, is designated as the constant current source 185, and the chain 112c is driven at the current amount (current 3) thus designated. Further, the pulse width control is performed such that a register value (PW 3) stored in the PW 3 register 193c, which is associated with the chain 112c connected to the first switch 184c, is output to the comparator 196. Based on the output from the comparator 196, the on-off control is performed on the second switch 187, and the chain 112c is driven at a pulse width corresponding to the register value (PW 3) thus designated.

In a period between time the t4 and a time t5, a selection signal for selecting the first switch 184d is selectable, while any other selection signal is not selectable. At this time, the current source control is performed such that a current amount (current 4) stored in the current 4 register 190d, which is associated with the chain 112d connected to the first switch 184d, is designated as the constant current source 185, and the chain 112d is driven at the current amount (current 4) thus designated. Further, the pulse width control is performed such that a register value (PW 4) stored in the PW 4 register 193d, which is associated with the chain 112d connected to the first switch 184d, is output to the comparator 196. Based on the output from the comparator 196, the on-off control is performed on the second switch 187, and the chain 112d is driven at a pulse width corresponding to the register value (PW 4) thus designated.

As described above, according to the first embodiment, the counter 192 is sequentially updated, to thereby select any one of the LED chains 112a to 112d while performing current control and pulse width modulation according to the selected LED chain. In other words, if a total sum of the lighting periods of the LED chains 112a to 112d is equal to or less than the entire cycle period (in the first embodiment, one vertical synchronization period), the plurality of LED chains 112a to 112d are controllable only by one constant current source 185 or one power supply circuit 182. Further, the constant current source 185 or the power supply circuit 182 may be operated at 100% of capacity, which increases the power consumption per circuit size to a maximum. This method is defined as time division LED chain selection method.

As described above, in the display device according to the first embodiment, the number of divided areas is sixteen, and hence, as illustrated in FIG. 2, four LED drive parts 180 illustrated in FIG. 3 are used, to thereby control a backlight formed of sixteen divided areas.

As described above, in the display device according to the first embodiment of the present invention, the area of the backlight constituting the display device is divided into sixteen divided areas, and the LEDs provided in the divided areas are chain-connected.

Then, selection means for selecting four divided areas selects four divided areas in a time division manner, and four backlight control means for controlling, for each divided area, turning-on and turning-off of the backlight of the four divided areas allow the light sources of the four divided areas selected by the selection means in a time division manner to be driven by sharing one backlight drive path of at least one backlight drive path, with the result that the LEDs of the sixteen divided areas may be driven by the four backlight control means. In other words, the circuit sizes of the control part for implementing the area light modulation function and the scanning backlight function and the backlight drive path may be reduced to be small. As a result, the heating value in the control part for implementing the area light modulation function and the scanning backlight function may be reduced while forming the backlight device at low cost, and hence the display device provided with the backlight device may also be reduced in heating value and formed at low cost.

It should be noted that, in the above-mentioned description made with reference to FIG. 2, one LED drive part 180 performs control with respect to the divided areas 113, 114, 115, and 116, which are arranged in a longitudinal direction. This is because the scanning backlight drive control are also performed in the longitudinal direction, and the four LED chains controlled by one LED drive part 180 are repeatedly turned on and turned off in a time division manner. However, in a case where divided areas arranged in a lateral direction are controlled by one LED drive part 180, the four divided areas are always turned on and turned off at the same time, and therefore the time division LED chain selection method may not be employed. Accordingly, in the case of employing the time division LED chain selection method, it is necessary to drive divided areas arranged in a longitudinal direction by one LED drive part 180. It should be noted that, in a case where the driving direction of the scanning backlight is in a lateral direction, rather than in a longitudinal direction as in a conventional display device, one LED drive part 180 may perform control on divided areas which are arranged in a lateral direction, to thereby implement the method.

[Second Embodiment]

Figure 6:
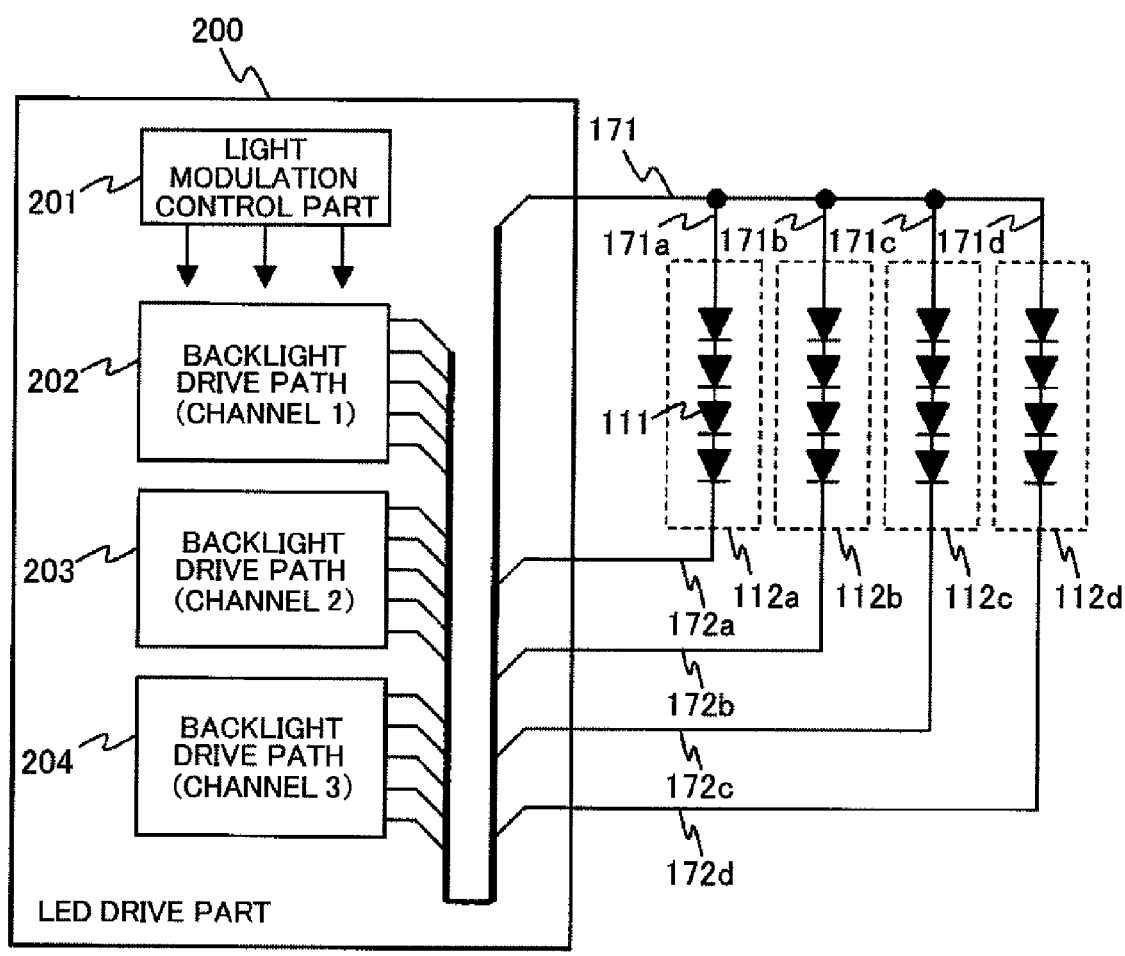
FIG. 6 is a diagram for illustrating an overview of a configuration of an LED drive part according to a second embodiment of the present invention.

FIG. 6 is a diagram for illustrating an overview of a configuration of an LED drive part 200 according to a second embodiment of the present invention, which illustrates how four LED chains 112a, 112b, 112c, and 112d are connected to the LED drive part 200 for performing control thereon. It should be noted that, in the first embodiment, the total sum of the lighting periods of the LED chains is restricted to be equal to or less than the vertical synchronization period, but the above-mentioned restriction is not imposed on a display device of the second embodiment. Further, the display device according to the second embodiment has a configuration similar to that of the display device according to the first embodiment except for the configuration of the LED drive part 200, and therefore a detailed description is given of the configuration of the LED drive part 200 in the following.

The LED drive part 200 of the second embodiment includes a plurality of backlight drive paths, as compared with the LED drive part 180 of the first embodiment illustrated in FIG. 3. It should be noted that, in the following description, the number of the backlight drive paths is described as the number of channels.

In the second embodiment, three backlight drive paths are provided, which include a first backlight drive path (channel 1) 202, a second backlight drive path (channel 2) 203, and a third backlight drive path (channel 3) 204. Each of the drive paths is the same in configuration as the backlight drive path 199 according to the first embodiment illustrated in FIG. 3.

A second light modulation control part 201 is different from the first light modulation control part 181 of the first embodiment in that the second light modulation control part 201 is capable of controlling a plurality of channels.

Figure 7:
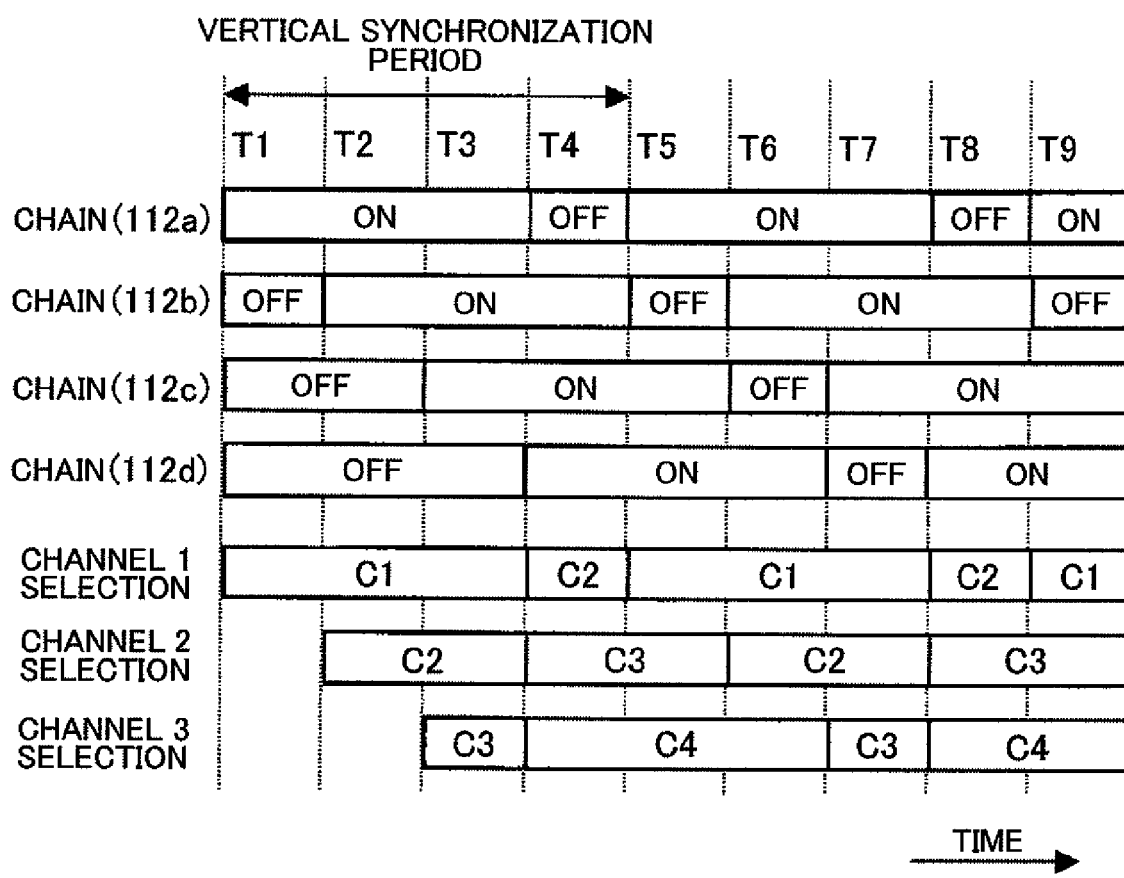
FIG. 7 is a chart for illustrating an operation of turning on and off LED chains, the operation being performed under the control of the LED drive part according to the second embodiment of the present invention.

FIG. 7 is a chart for illustrating an operation of turning on and off the LED chains, the operation being performed under the control of the LED drive part 200 according to the second embodiment of the present invention. According to FIG. 7, the LED chains 112a, 112b, 112c, and 112d are turned on, in one vertical synchronization period, for a three-fourth of the period as being shifted by a one-fourth of the period. In other words, the LED drive part 200 includes the backlight drive paths (channels 1 to 3) 202 to 204 for three channels, and the backlight drive paths (channels 1 to 3) 202 to 204 are each used in a time division manner, to thereby turn on and off the LED chains.

Hereinbelow, with reference to FIG. 7, an operation of turning on and off each of the LED chains 112a, 112b, 112c, and 112d, based on the control performed by the LED drive part 200 according to the second embodiment of the present invention is described. It should be noted that, according to the LED drive part 200 of the second embodiment, it is not until a time T3, which is the time after a lapse of a two-fourth period from the start of control, that the LED drive part 200 enters into a state (steady state) in which the LED chains 112a, 112b, 112c, and 112d may be turned on for a three-fourth of the period. Accordingly, in the following description, an operation at and after the time T3 is described. In FIG. 7, reference symbols C1 to C4 illustrated in relation to the channel selection 1 to 3 correspond to the LED chains 112a to 112d.

At the time T3, in order to turn on the LED chains 112a to 112c, the backlight drive paths (channels 1 to 3) 202 to 204 each select the LED chains 112a to 112c.

At a time T4, in order to turn on the LED chains 112b to 112d, the backlight drive paths (channels 1 to 3) 202 to 204 each select the LED chains 112b to 112d.

At a time T5, in order to turn on the LED chains 112a, 112c, and 112d, the backlight drive paths (channels 1 to 3) 202 to 204 each select the LED chains 112a, 112c, and 112d.

At a time T6, in order to turn on the LED chains 112a, 112b, and 112d, the backlight drive paths (channels 1 to 3) 202 to 204 each select the LED chains 112a, 112b, and 112d.

A time T7 is under the same condition as that for the time T3, and hence the selection operations performed at the times T3 to T6 as described above are repeated from the time T7 and afterward, to thereby turn on the LED chains 112a, 112b, 112c, and 112d in one vertical synchronization period for a three-fourth of the period as being shifted by a one-fourth of the period.

Scheduling the selection in the second embodiment may be implemented by fixed priority scheduling, in which the LED chain 112a, the LED chain 112b, the LED chain 112c, and the LED chain 112d are given priority in the stated order, and the LED chains are allocated to the backlight drive path (channel 1) 202, the backlight drive path (channel 2) 203, and the backlight drive path (channel 3) in the stated order. The selection scheduling according to the present invention is not limited to the fixed priority scheduling.

According to the second embodiment, even in a case where the total sum of the lighting periods of the LED chains exceeds the vertical synchronization period, the number of channels for forming one LED drive part 200 may be smaller than the number of LED chains. Further, even in the LED drive part 200 according to the second embodiment, similarly to the LED drive part 180 of the first embodiment, one power supply circuit or one constant current source is shared in common by the plurality of LED chains, to thereby reduce the circuit size to be small.

Further, according to the description of the second embodiment, one LED drive part 200 is capable of controlling a plurality of divided areas in a longitudinal direction. For example, in a case where the number of divided areas in the longitudinal direction is four and the lighting period for each divided area is a three-fourth of the one vertical synchronization period, the divided areas are controllable by the LED drive part 200 which includes the backlight drive paths for three channels. This is because each LED drive circuit 200 is guaranteed to have a turned-off period, and the turned-off period may be allocated in a time division manner for controlling another LED chain. Accordingly, the number of channels to be provided for the LED 200 may be smaller than the number of divided areas in a longitudinal direction.

Further, according to a conventional drive method, the number of backlight drive paths is equal to the number of LED chains, and hence the LED drive part needs to be designed with a maximum ratings determined based on the current amount and the heating value to be generated when all the backlight drive paths are concurrently operated, that is, a maximum operating condition. According to the second embodiment, one LED drive part 200 is capable of driving a large number of LED chains with a smaller number of backlight drive paths. Therefore, the number of backlight drive paths is smaller as compared with the conventional method. Accordingly, the maximum rated values are suppressed to be small, which improves the yields of the LED drive part.

As described above, also in the display device provided with the LED drive part 200 according to the second embodiment of the present invention, the area of the backlight constituting the display device is divided into sixteen divided areas, and the LEDs provided in the divided areas are chain-connected. Then, selection means for selecting four divided areas selects four divided areas in a time division manner, and four LED drive parts 200 serving as backlight control means for controlling, for each divided area, turning-on and turning-off of the backlight of the four divided areas allows the light sources of the four divided areas selected by the selection means in a time division manner to be driven by sharing one backlight drive path of the three backlight drive paths 202 to 204, with the result that the LEDs of the sixteen divided areas may be driven by the four LED drive parts 200. In other words, the circuit sizes of the control part for implementing the area light modulation function and the scanning backlight function and the backlight drive path may be reduced to be small. As a result, the heating value in the control part for implementing the area light modulation function and the scanning backlight function may be reduced while forming the backlight device at low cost, and hence the display device provided with the backlight device may also be reduced in heating value and formed at low cost.

[Third Embodiment]

Figure 8:
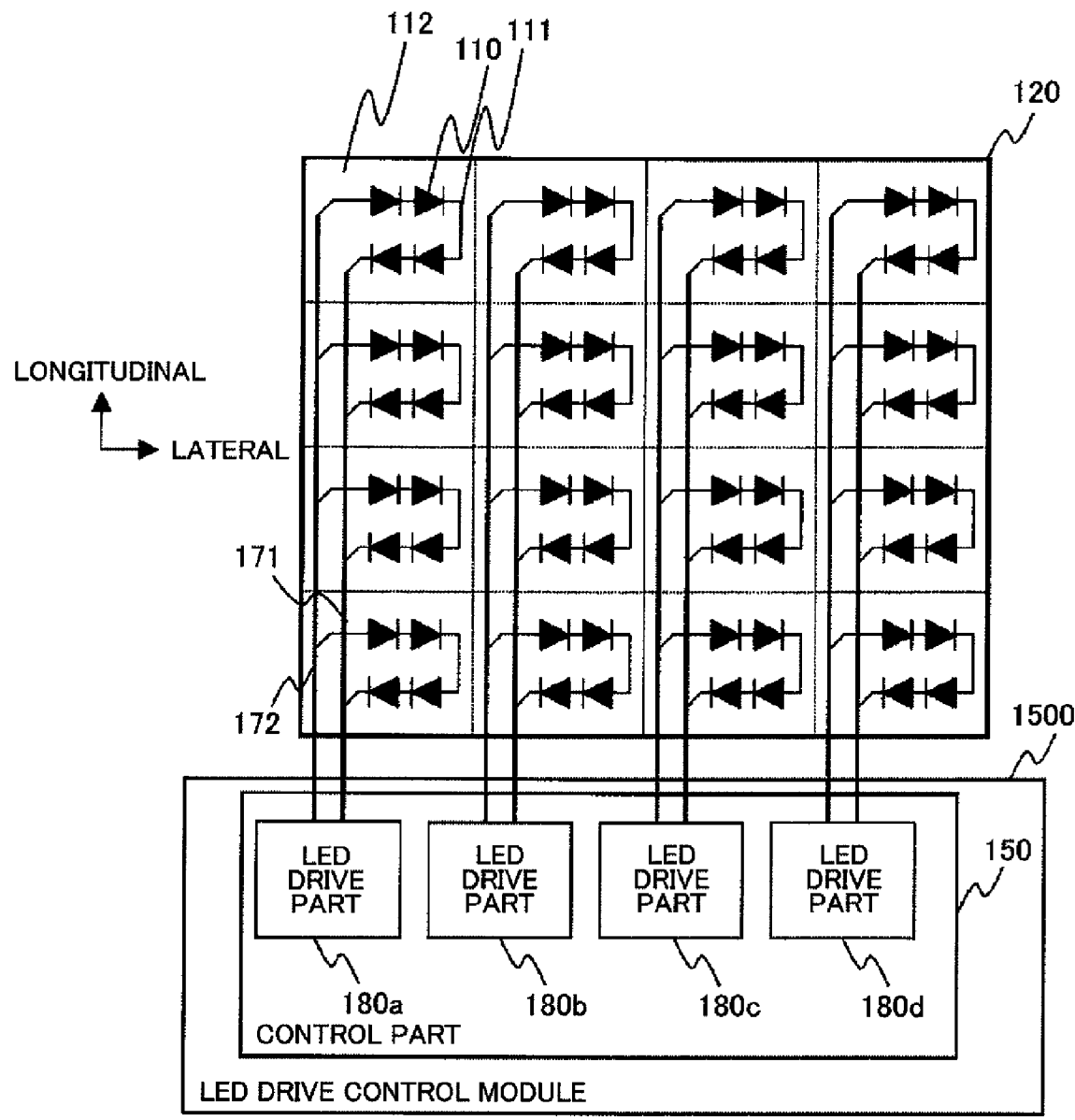
FIG. 8 is a diagram for illustrating physical positions of a frame, a plurality of light sources, and an LED drive control module, which are included in a backlight module according to a third embodiment of the present invention.

FIG. 8 is a diagram for illustrating a physical positional relation among a frame 120, a plurality of light sources 110, and an LED drive part 180, which are included in a backlight module according to a third embodiment of the present invention. It should be noted that the connection in FIG. 8 is the same as that of FIG. 2, and the description thereof is omitted. FIG. 8 is different from FIG. 2 in that the control part 150 is disposed inside an LED drive control module 1500. The LED drive control module 1500 may be formed of a printed circuit board. The LED drive control module 1500 may be small enough in area with respect to the frame 120, and hence the LED drive control modules 1500 may be arranged in the same direction as the scanning direction of the screen and disposed at an upper side, a lower side, or a back side of the frame 120. In this example, the scanning direction is described as a lateral direction.

The anode signal 171 and the cathode signal 172 connected to one LED drive part 180 are connected in a longitudinal direction. Accordingly, unlike in the case where the LED drive control modules 1500 are disposed in the longitudinal direction, when the LED drive control modules 1500 are disposed in the lateral direction, the LED drive parts 180 and the divided areas 120 may be arranged linearly, which may minimize the wiring lengths of the anode signal 171 and the cathode signal 172. As a result, the wiring length is reduced, to thereby attain a reduction of cost.

[Fourth Embodiment]

Figure 9:
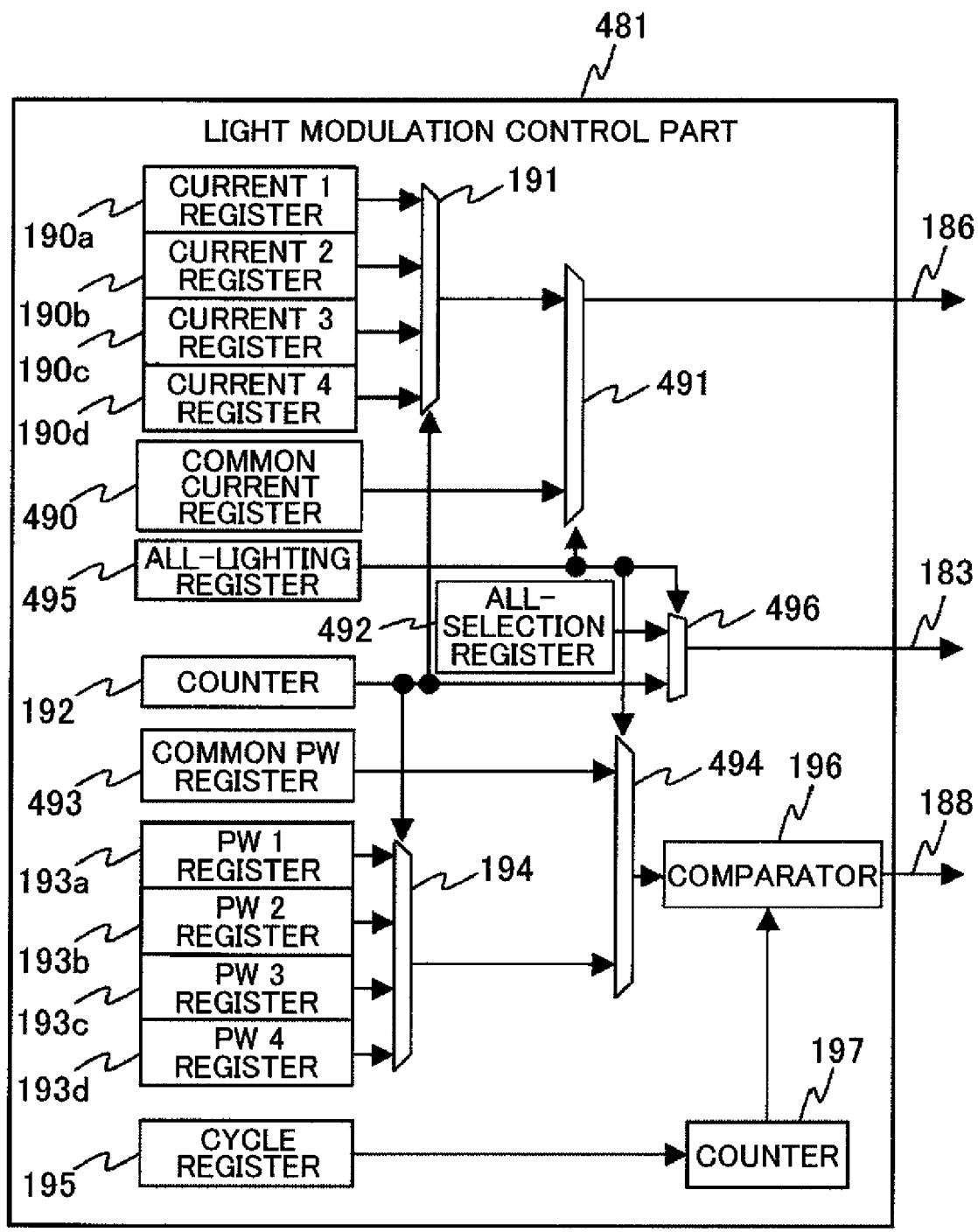
FIG. 9 is a diagram for illustrating in detail a first light modulation control part according to a fourth embodiment of the present invention.

FIG. 9 is a diagram for illustrating in detail a first light modulation control part 481 according to a fourth embodiment of the present invention.

The first embodiment is illustrated as an example in which each area is turned on in a time division manner, on the assumption that the scanning backlight function is provided. The scanning backlight function is effective at reducing blurs which occur when displaying a moving image. However, when the entire screen is turned on and off, the screen may look shining unsteadily depending on the frequency of turning on and off the screen, which is identified as a problem of so-called flicker. For this reason, when displaying, for example, a still image or the like, it is effective to provide a function of turning on and off the scanning backlight function so that the scanning backlight function may be turned off in order that the entire backlight is lighted, to thereby prevent the flicker.

The display device according to the fourth embodiment of the present invention is provided in view of the above-mentioned circumstances, and is different from the display device according to the first embodiment of the present invention in that a function of turning on and off the scanning backlight is additionally provided thereto.

In the following description, a state where the scanning backlight function is turned off for allowing the LEDs on the entire screen to be turned on is defined as all-selection mode (second lighting mode), while a state where the scanning backlight function is turned on is defined as scanning backlight mode (first lighting mode).

As is apparent from FIG. 9, the fourth embodiment of the present invention is different, as compared with the first embodiment illustrated in FIG. 4, in that an all-lighting register 495, a common current register 490, a common PW register 493, all-selection register 492, a selector 491, a selector 494, and a selector 496 are additionally provided. The fourth embodiment shares the rest in common with the embodiment of FIG. 4, and therefore the description of the overlapping parts is omitted.

The all-lighting register 495 is a register for turning on and off the scanning backlight function.

The common current register 490 and the common PW register 493 each are a register for designating a current amount and a register for designating a pulse modulation width, respectively, in the all-selection mode.

The all-selection register 492 includes an LED chain selection signal for selecting all the LED chains connected to the backlight drive path.

The selector 491, the selector 494, and the selector 496 each select a current amount, a pulse modulation width, and an LED chain selection signal, respectively, according to the value of the all-lighting register 495. In the all-selection mode, the values of the common current register 490, of the common PW register 493, and of the all-selection register 492 are selected to be output. On the other hand, in the scanning backlight mode, the values selected by the selectors 491 and 494 and a value of the counter 192 are output.

That is, in the fourth embodiment, the selector 491 for controlling the output of the selector 191 is provided, and an output selected by the selector 491 is output as the constant current selection signal 186. Accordingly, the selector 491 selects one of an output from any one of the current 1 to 4 registers 190*a* to 190*d* selected by the selector 191 and an output from the common current register 495, and the selected output is output as the constant current control signal 186.

Similarly, the selector 494 for controlling the output of the selector 194 is provided, and an output selected by the selector 494 is output as a signal for the comparator 196. Accordingly, the selector 494 selects one of an output from any one of the PW 1 to PW 4 registers 193*a* to 193*d* selected by the selector 194 and an output from the common PW register 493, and the selected output is output to the comparator 196.

Further, the selector 496 for controlling the output from the counter 192 is provided, and one of the count value of the counter 192 and the output value of the all-selection register 492 is selected by the selector 496 and output as the LED chain selection signal 183.

However, in the fourth embodiment, a signal output from the all-lighting register 495 is used as a selection control signal for the selectors 491, 494, and 496. At this time, in the fourth embodiment, a control signal from an external device (not shown) is stored in the all-lighting register 495, and the switching between the all-selection mode and the scanning backlight mode is controlled based on the value thus stored. Meanwhile, the control signal from the external device may be directly used for directly controlling the selectors 491, 494, and 496 based on the control signal, to thereby control the switching between the all-selection mode and the scanning backlight mode. The control signal in this case may include a signal from setting means through which a viewer makes settings according to the preferences or a signal from analysis means for generating a control signal according to the information on a video image (as to whether the image is a moving image or a still image, or the like).

Figure 10:
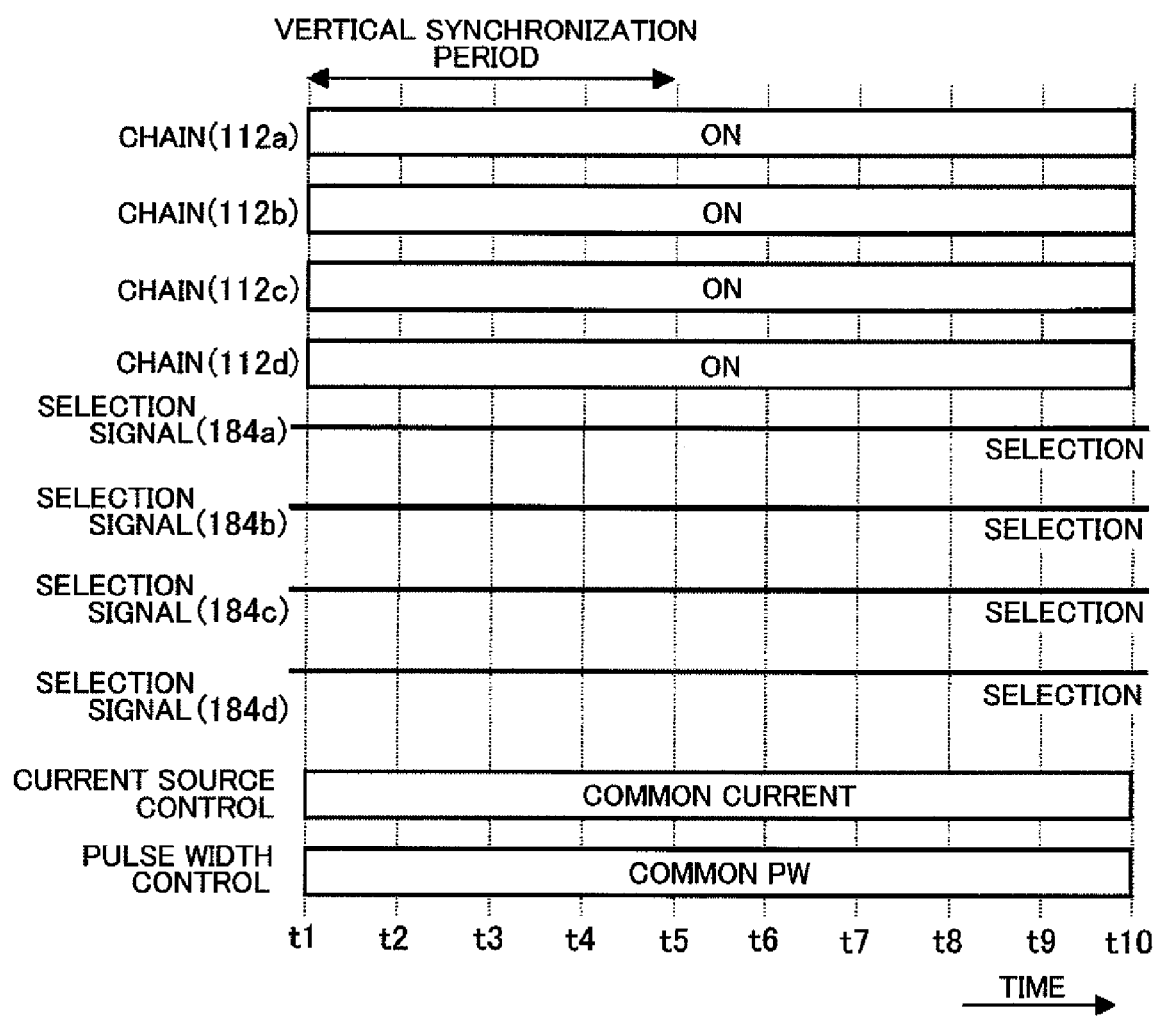
FIG. 10 is a chart for illustrating in detail an operation of turning on and off LED chains, the operation being performed under the control of an LED drive part according to the fourth embodiment of the present invention.

Next, FIG. 10 illustrates a chart for illustrating the operation of turning on and off the LED chains, the operation being performed under the control of the LED drive part 180 according to the fourth embodiment of the present invention. In the following, a description is given of an operation of turning on and off the backlight performed by the LED drive part 180 which includes a first light modulation control part 481 of the fourth embodiment. FIG. 10 illustrates a lighting pattern in the all-selection mode. Further, the display device according to the fourth embodiment is similar in configuration to the display device of the first embodiment, except for the configuration of the light modulation control part, and therefore, in the following description, the operation of turning on and off the backlight is described with reference to FIGS. 1 to 3, and 8 to 10.

In the scanning backlight mode illustrated in FIG. 5, four selection signals are used to sequentially turn on the four LED chains. On the other hand, the all-selection mode is different in that the four LED chains are simultaneously selected. Further, in the scanning backlight mode, the current value control and the pulse width control are sequentially changed in accordance with the selection of the four LED chains, whereas the all-selection mode is different in that a common current value and a common pulse width are always used.

Specifically, in controlling the turning on and off of the LED chains 112*a* to 112*d* by the LED drive part 180 which includes the first light modulation control part 481 of the fourth embodiment, an output from the all-selection register 492 is output by the selector 496 as the LED chain selection signal 183. At this time, the output value from the all-selection register 492 includes a signal for turning on all the first switches 184*a* to 184*d*, that is, a signal for selecting all the first switches 184*a* to 184*d*. As a result, as illustrated in FIG. 10, the LED chain selection signal 183 is input to the first switches 184*a* to 184*d* for selecting the switches, and therefore the first switches 184*a* to 184*d* for controlling the connection between the LED chains 112*a* to 112*d* and the constant current source 185 are all turned on. In this manner, all the LED chains 112*a* to 112*d* are connected to the constant current source 185.

As a result, as illustrated in FIG. 10, the LED chains 112*a* to 112*d* are all turned on in all the periods indicated by the times t1 to t10. At this time, the LED chains 112*a* to 112*a* thus turned on are controlled based on a current amount in the constant current source 185 and the pulse width modulation by the second switch 187. The constant current source 185 is controlled based on the constant current control signal 186, that is, a value set to the common current register 490. Further, the second switch 187 is controlled based on the pulse width modulation signal 188, that is, a value set to the common PW register 493.

At this time, in the display device according to the fourth embodiment, the LED chains 112*a* to 112*d*, which are connected to the same LED drive part 180*a*, are connected in parallel. Accordingly, the LED chains 112*a* to 112*d* are applied with the same voltage, and subjected to the pulse width modulation at the same timing. Further, the same amount of current flows through the LED chains 112*a* to 112*d*.

Here, in the display device according to the fourth embodiment, the LED drive parts 180*a* to 180*d* each are provided with the first light modulation control part 481. Accordingly, the all-lighting register 495 is set by setting the same value to the common current register 490, the common PW register 493, and the all-selection register 492 in each of the LED drive parts 180*a* to 180*d*, to thereby set the LED drive parts 180*a* to 180*d* to be in the all-selection mode. Consequently, all the LED chains are turned on at the same backlight intensity. As a result, there is obtained a significant effect of attaining an excellent display without flicker.

On the other hand, as described above, the LED drive parts 180*a* to 180*d* are each capable of operating independently of one another, and hence a line of the divided areas 112 of FIG. 8 which are arranged side by side in a longitudinal direction have the same backlight intensity. However, with the LED drive parts 180*a* to 180*d* which are each capable of operating independently of one another, the backlight intensity in a lateral direction may be controlled to be different. In particular, when displaying a still image or the like, the luminance may not need to be controlled for each divided area 112, unlike in the case of displaying a moving image. Accordingly, in a case where it is necessary to control the backlight intensity only in a lateral direction of the screen when displaying a still image as described above, the backlight intensity may be controlled for each of the LED drive parts 180*a* to 180*d*, which reduces power consumption of the display device.

Further, the display device according to the fourth embodiment is capable of controlling the current amount and the emission luminance for each of the LED chains each connected to the LED drive parts 180*a* to 180*d*, respectively, even in the all-selection mode. Accordingly, the current amount of the constant current source 185 and the modulation width of the second switch 187 for each of the LED drive parts 180*a* to 180*d* may be adjusted, to thereby correct the differences in emission amount and in color shade due to the variations in the light sources 110.

Next, a description is given of a relation between the constant current source 185 and the pulse modulation width for controlling the second switch 187, and the power consumption in the display device according to the fourth embodiment, in the all-selection mode. In the all-selection mode, the LED chains may share a common value for the current amount and the pulse modulation width. At this time, the current amount in the all-selection mode may be set to be different from that in the scanning backlight mode.

For example, in order to simultaneously turn on all the LED chains connected to the backlight drive path 199, it may be contemplated increasing the current amount of the constant current source 185 in the all-selection mode, as compared with the scanning backlight mode.

In a case where the number of the LED chains connected to the backlight drive path 199 is q (q is a natural number), all the q LED chains are simultaneously selected in the all-selection mode, and therefore the current amount per one LED chain is 1/q. However, it is generally known that the color emitted by an LED may appear different depending on the current amount. Accordingly, when the current amount per one LED chain is different between the all-selection mode and the scanning backlight mode, there arises a problem that the display color shade becomes different between the two modes.

To solve the problem, for example, the current amount in the constant current source 185 may be increased by q times. As a result, the current amount per one LED chain is obtained as q/q=1, which is equal to the current amount in the scanning backlight mode, and the difference in color shade may be suppressed.

However, in the above-mentioned example, a power consumption in the backlight is also increased by q times. In order to avoid the increase, the current amount in the constant current source 185 in the all-selection mode may be adjusted such that the power consumption may be equal between the all-selection mode and the scanning backlight mode.

For example, in a case where the number of the LED chains is q similarly to the above, and further the turn-on period in the scanning backlight mode is p/q (p is a natural number satisfying p<q), the current amount in the constant current source 185 in the all-selection mode is set top times larger than the current amount in the constant current source 185 in the scanning backlight mode. This is because the power consumption is determined as a product of the current amount and the turn-on time.

When the current amount in the constant current source 185 in the scanning backlight mode is set to 1, the following relation is established. In the scanning backlight mode, the current amount per LED chain is 1, the turn-on period is p/q times, and the number of LED chains turned on is q, and therefore the power consumption is obtained as a product of those values, that is, p (=1×p/q×q).

On the other hand, in the all-selection mode, the current amount in the constant current source 185 is increased by p times, and therefore the current amount per each of the all-selected LED chains is p/q times. Here, the current amount per LED chain is p/q times, the turn-on period is 1, and the number of LED chains turned on is q, and therefore the power consumption is obtained as a product of those values, that is, p (=p/q×1×q). Accordingly, the power consumption may be maintained to be equal between the two modes, that is, the all-selection mode and the scanning backlight mode.

Alternatively, there may be another method of solving the problem that the display color shade becomes different between the all-selection mode and the scanning backlight mode. According to the method, the display data 160 may be corrected in color shade depending on the mode, prior to being transmitted to the display panel 140.

Further, in the scanning backlight mode in the display device according to the fourth embodiment of the present invention, the selector 491 outputs an output from the selector 191, as the constant current control signal 186, based on the control signal from the all-lighting register 495. Similarly, the selector 494 outputs an output from the selector 194, to the comparator 196, and the selector 496 outputs a count value of the counter 192, as the LED chain selection signal 183. The operations to be performed at this time are similar to those in the case of the display device of the first embodiment.

As described above, in the display device according to the fourth embodiment of the present invention, the selectors 491, 494, and 496 are each controlled based on a control signal from the all-lighting register 495, the control signal being set according to the preference of a viewer or the information on the video image (as to whether the image is a moving image or a still image, or the like). In the scanning backlight mode (first lighting mode), the selector 491 is caused to output, as the constant current control signal 186, an output from the selector 191 while the selector 496 is caused to output, as the LED chain selection signal 183, a count value of the counter 192, and further the selector 494 is caused to output an output from the selector 194, to the comparator 196. Meanwhile, in the all-selection mode (second lighting mode), the selector 491 is caused to output, as the constant current control signal 186, an output from the common current register 490 while the selector 496 is caused to output, as the LED chain selection signal 183, an output from the all-selection register 492, and further the selector 494 is caused to output an output from the common PW register 493, to the comparator 196. With this configuration, in addition to the effect obtained in the display device according to the first embodiment described above, there may be obtained a significant effect of attaining excellent display without flicker.

[Fifth Embodiment]

Figure 11:
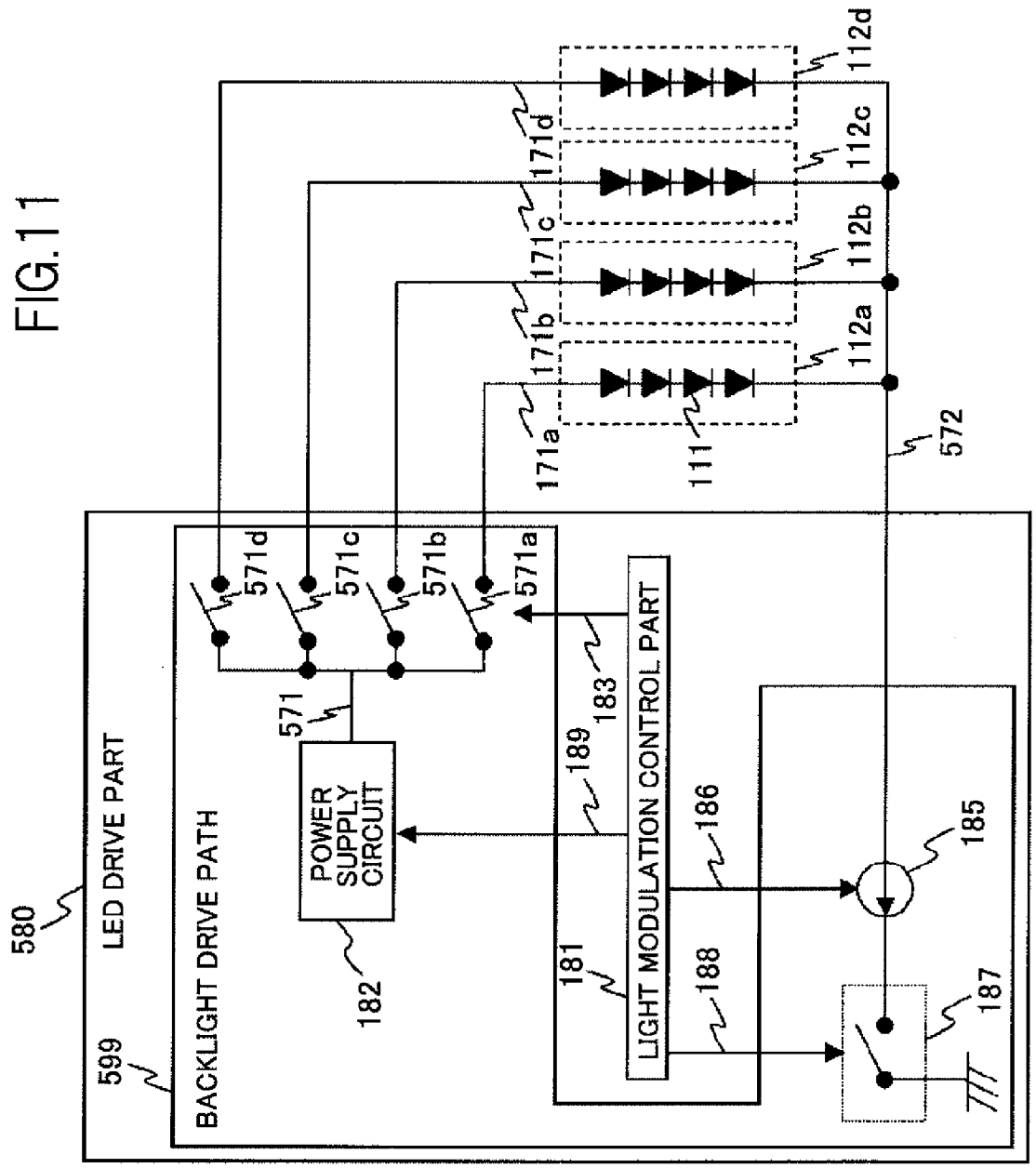
FIG. 11 is a diagram for illustrating in detail an LED drive part according to a fifth embodiment of the present invention.

FIG. 11 is a diagram for illustrating in detail an LED drive part 580 according to a fifth embodiment of the present invention. It should be noted that the LED drive part 580 of the fifth embodiment is similar in configuration to the LED drive part 180 of the first embodiment, except for the configuration of the signal lines 171a, 171b, 171c, and 171d of an anode signal 571 and first switches 571a, 571b, 571c, and 571d. Accordingly, in the following description, signal lines 171a, 171b, 171c, and 171d and the first switches 571a, 571b, 571c, and 571d are described in detail.

In the first embodiment of the present invention described with reference to FIG. 3, the backlight drive path 199 is configured such that the LED chains share the anode signal 171 in common while the signal lines 172a, 172b, 172c, and 172d of cathode signal are selected by the first switches 184a, 184b, 184c, and 184d. In other words, the number of the signal lines 172a, 172b, 172c, and 172d of cathode signal is larger than the number of the signal lines for the anode signal 171 for the LED chains.

As compared with the configuration of the first embodiment described above, in the LED drive part 580 of the fifth embodiment illustrated in FIG. 11, a backlight drive path 599 is configured such that the LED chains share a cathode signal 572 (signal on the ground side) in common while the signal lines 171a, 171b, 171c, and 171d for the anode signal 571 are selected by the first switches 571a, 571b, 571c, and 571d. In other words, the number of the signal lines 171a, 171b, 171c, and 171d for the anode signal 571 is larger than the number of the signal lines for the cathode signal 572 for the LED chains.

Specifically, in the LED drive part 580 of the fifth embodiment, the four first switches 571a to 571d, which are associated with the four LED chains 112a to 112d, are disposed on the side of the anode signal 571 which is output from the power supply circuit 182, to thereby control the power supply to the LED chains 112a to 112d. Accordingly, the first switch 571a disposed between the power supply circuit 182 and the LED chain 112a controls the power supply from the power supply circuit 182 to the LED chain 112a, based on the LED chain selection signal 183. Further, the first switch 571b disposed between the power supply circuit 182 and the LED chain 112b controls the power supply from the power supply circuit 182 to the LED chain 112b, based on the LED chain selection signal 183. Still further, the first switch 571c disposed between the power supply circuit 182 and the LED chain 112c controls the power supply from the power supply circuit 182 to the LED chain 112c, based on the LED chain selection signal 183. Still further, the first switch 571d disposed between the power supply circuit 182 and the LED chain 112d controls the power supply from the power supply circuit 182 to the LED chain 112d, based on the LED chain selection signal 183.

Further, in the LED drive part 580 of the fifth embodiment, the LED chains 112a to 112d have the cathode sides thereof commonly connected to the constant current source 185, as the cathode signal 572 of the LED chains.

Accordingly, the LED drive part 580 of the fifth embodiment is also capable of performing the scanning backlight control, which is a light modulation control based on the constant current control signal 186, the pulse width modulation signal 188, and the power supply control signal 189, and the LED chain selection signal 183 for performing on-off control on the first switches 571a to 571d, the signals being sent from the first light modulation control part 181, and therefore there may be obtained an effect similar to that of the display device of the first embodiment.

Further, as an LED drive circuit, there is a semiconductor integrated circuit (IC) commercially available which includes at least one power supply circuit and at least one constant current source as illustrated in FIG. 1 of JP 2006-352011 A. As regards the number of circuits mounted on the IC, the number m of the power supply circuits is smaller than the number n of constant current sources (m<n) in general.

In the case of using the IC as described above to form the display device of the present invention, the configuration according to the fifth embodiment has an advantage that less switches and wirings are required as compared with the configuration according to the first embodiment.

The reason is that, in the first embodiment, the number of the first switches necessary for forming the circuit is equal to the number of the constant current sources (that is, the number is n), whereas in the fifth embodiment, the number of the first switches necessary for forming the circuit is equal to the number of the power supply circuits (that is, the number is m). As described above, m is smaller than n, and therefore the configuration according to the fifth embodiment has an advantage that the number of the first switches is smaller and hence the circuit may be formed more simply and at lower cost.

Figure 13:
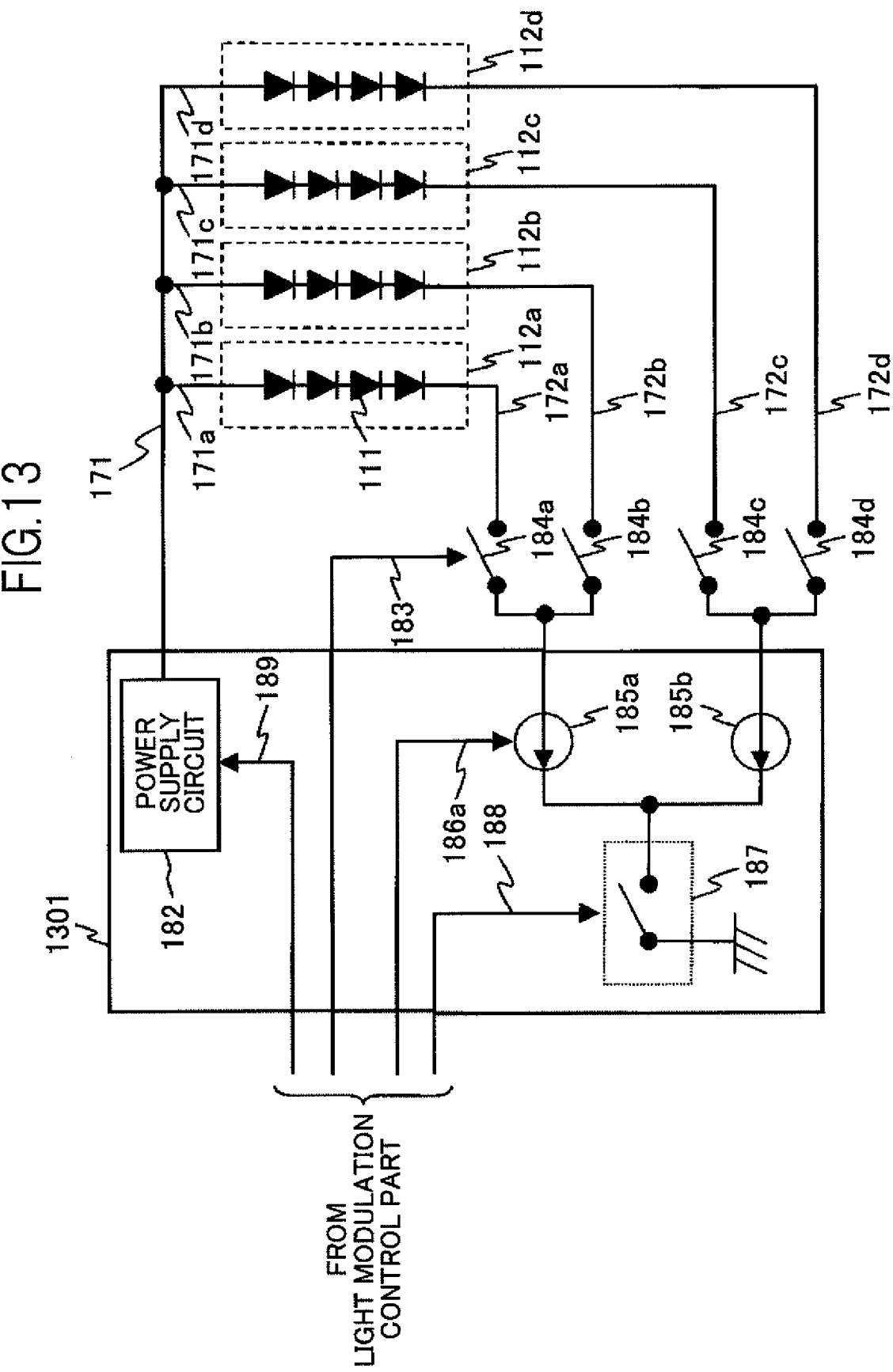
FIG. 13 is a diagram for illustrating an overview of an LED drive part in a case where a semiconductor IC which includes a power supply circuit and a constant current source is applied to the display device according to the first embodiment of the present invention.
Figure 14:
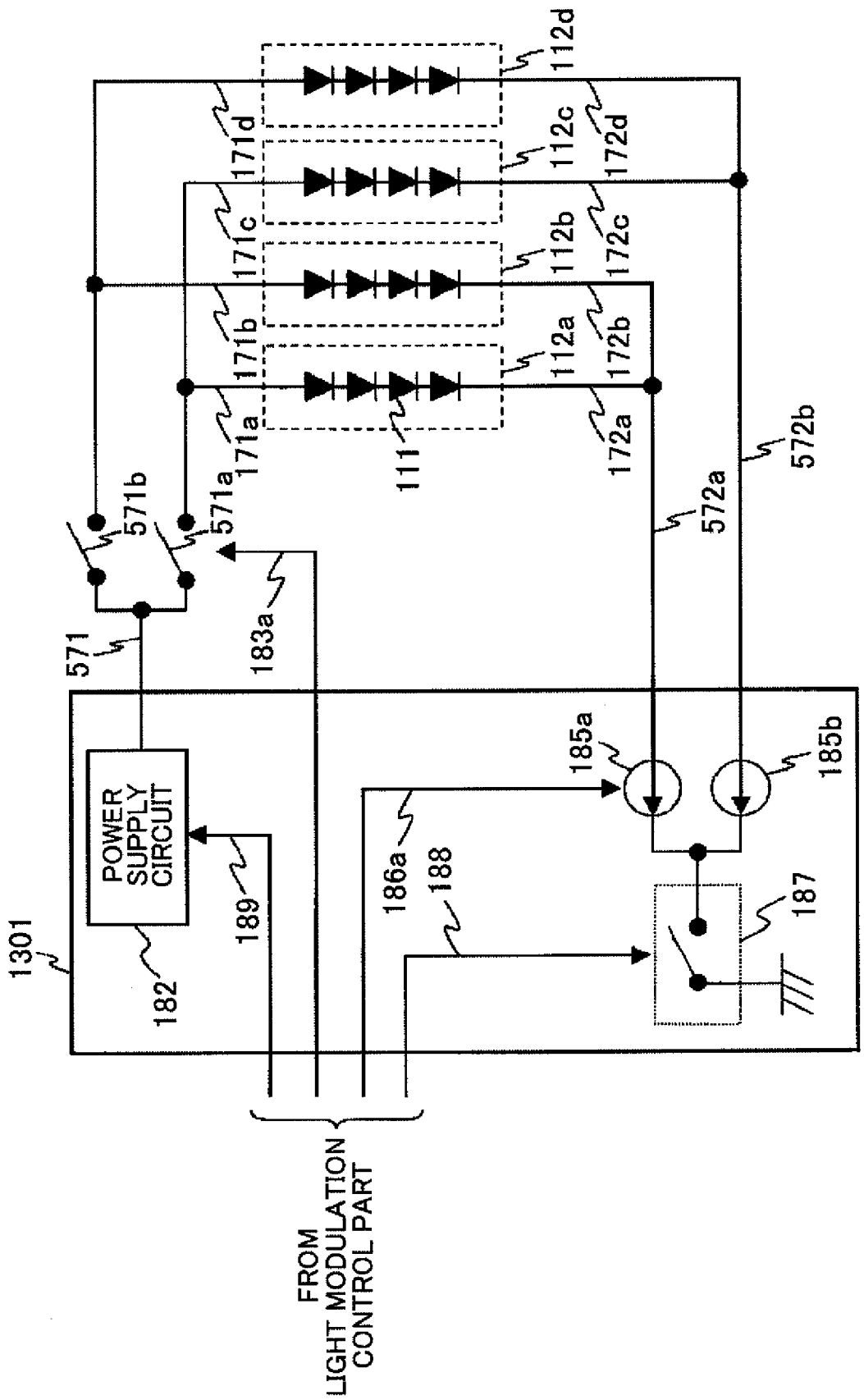
FIG. 14 is a diagram for illustrating an overview of an LED drive part in a case where a semiconductor IC which includes a power supply circuit and a constant current source is applied to the display device according to the fifth embodiment of the present invention.

FIG. 13 is a diagram for illustrating an overview of an LED drive part in a case where a semiconductor IC which includes a power supply circuit and a constant current source is applied to the display device according to the first embodiment of the present invention, and FIG. 14 is a diagram for illustrating an overview of an LED drive part in a case where a semiconductor IC which includes a power supply circuit and a constant current source is applied to the display device according to the fifth embodiment of the present invention. In the following, the above-mentioned effect is described in detail, with reference to FIGS. 13 and 14. It should be noted that, for the sake of simplicity, the description is given only of a case of employing a semiconductor IC 1301 which includes one power supply circuit 182, two constant current sources 185a and 185b, and one second switch 187. However, the numbers of the LED chains, the power supply circuits, and the constant current sources are not limited thereto. Further, the semiconductor IC 1301 does not include the first switches 184a to 184d, 571a, and 571b, and therefore the first switches 184a to 184d, 571a, and 571b are externally provided.

In the configuration illustrated in FIG. 13, the power supply control signal 189 for controlling the power supply circuit 182, a constant current control signal 186a for controlling the two constant current sources 185a and 185b, and the pulse width modulation signal 188 for controlling the second switch 187 are supplied from the light modulation control part (not shown) to the corresponding input terminals of the semiconductor IC 1301.

Further, the anode signal 171 which is an output from the power supply circuit 182 is connected to the LED chains 112a to 112d on the anode side thereof, via the signal lines 171a to 171d. On the other hand, the LED chains 112a to 112d are connected on the cathode side thereof to the constant current sources 185a and 185b via the first switches 184a to 184d disposed on the signal lines 172a to 172d. At this time, the first switches 184a to 184d receive the LED chain selection signal 183 input from the light modulation control part (not shown), and hence only the desired ones of the LED chains 112a to 112d are connected to the constant current sources 185a and 185b, to thereby perform the scanning backlight control.

As described above, in the configuration of the display device according to the first embodiment, the on-off control of the power supply to the LED chains 112a to 112d is performed through the first switches 184a to 184d, and therefore the four first switches 184a to 184d are necessary.

On the other hand, the configuration illustrated in FIG. 14 is similar to the configuration illustrated in FIG. 13 in that the power supply control signal 189 for controlling the power supply circuit 182, the constant current control signal 186a for controlling the two constant current sources 185a and 185b, and the pulse width modulation signal 188 for controlling the second switch 187 are supplied from the light modulation control part (not shown) to the corresponding input terminals of the semiconductor IC 1301.

With this configuration, the anode signal 571 output from the power supply circuit 182 is supplied to the LED chains 112a to 112d from the anode side thereof, via the first switches 571a and 571b disposed on the signal lines 171a to 171d. On the other hand, the LED chains 112a to 112d are directly connected on the cathode side thereof to the constant current sources 185a and 185b via the signal lines 172a to 172d.

At this time, in the configuration of FIG. 14, the anode signal 571 is supplied to the LED chains 112a and 112c from the anode side thereof, via the first switch 571a. Alternatively, the anode signal 571 is supplied to the LED chains 112b and 112d from the anode side thereof, via the first switch 571b.

On the other hand, the LED chains 112a and 112b are connected on the cathode side thereof to the cathode signal 572a of the constant current source 185a via the signal lines 172a and 172b. Alternatively, the LED chains 112c and 112d are connected on the cathode side thereof to the cathode signal 572b of the constant current source 185b via the signal lines 172c and 172d.

With this configuration, the on-off control on the current in the two constant current sources 185a and 185b and the on-off control on the two first switches 571a and 571b are combined, to thereby control power supply to the four LED chains 112a to 112d, which enables the scanning backlight control. Therefore, the number of the first switches in the configuration according to the fifth embodiment is smaller, and hence there is obtained a significant effect that the circuit may be formed more simply at lower cost.

It should be noted that the light modulation control part according to the fourth embodiment is also applicable to the light modulation control part 181 in the fifth embodiment. With this configuration, as in the fourth embodiment, the light modulation operation may be performed according to the scanning backlight mode and the all-selection mode, and therefore an effect similar to that of the display device of the fourth embodiment is obtained.

Further, in a case where the light modulation control part 481 of the fourth embodiment is used to form the LED drive part as illustrated in FIGS. 13 and 14, that is, in a case where a semiconductor IC including two or more constant current sources 185 is employed, the constant current amount may be adjusted with respect to each of the constant current sources 185*a* and 185*d*, 571*a*, and 571*b* are turned on. In other words, the current amount in the LED chains 112*a* and 112*b* connected to the constant current source 185*a* and the current amount in the LED chains 112*c* and 112*d* connected to the constant current source 185*b* may be set to values different from each other, when driving the LED chains. As a result, the divided areas associated with the LED chains 112*a* and 112*b* may be controlled to have a luminance different from that of the divided areas associated with the LED chains 112*c* and 112*d*.

Further, the four LED chains 112*a* to 112*d* for one row, which are connected to one LED drive part 180, may be controlled, in a backlight area corresponding to a single longitudinal line in the display device, such that the upper half of the backlight area (corresponding to the LED chains 112*a* and 112*b*) and the lower half of the backlight area (corresponding to the LED chains 112*c* and 112*d*) each may emit light at a luminance different from each other. It should be noted that even in this case, in the divided areas forming a single longitudinal line in the display device, pixels corresponding to the upper half of the backlight area and pixels corresponding to the lower half of the backlight area may be adjusted in color temperature as described above, to thereby suppress fluctuation in the display color due to the difference in current amount flowing through each of the LED chains 112*a* to 112*d*. Further, the backlight may be subjected to light modulation, to thereby further reduce power consumption.

It should be noted that the LED chains to be connected to the same constant current source 185*a* may not be limited to the LED chains 112*a* and 112*b*, and the LED chains to be connected to the constant current source 185*b* may not be limited to the LED chains 112*c* and 112*d*.

[Sixth Embodiment]

Figure 12:
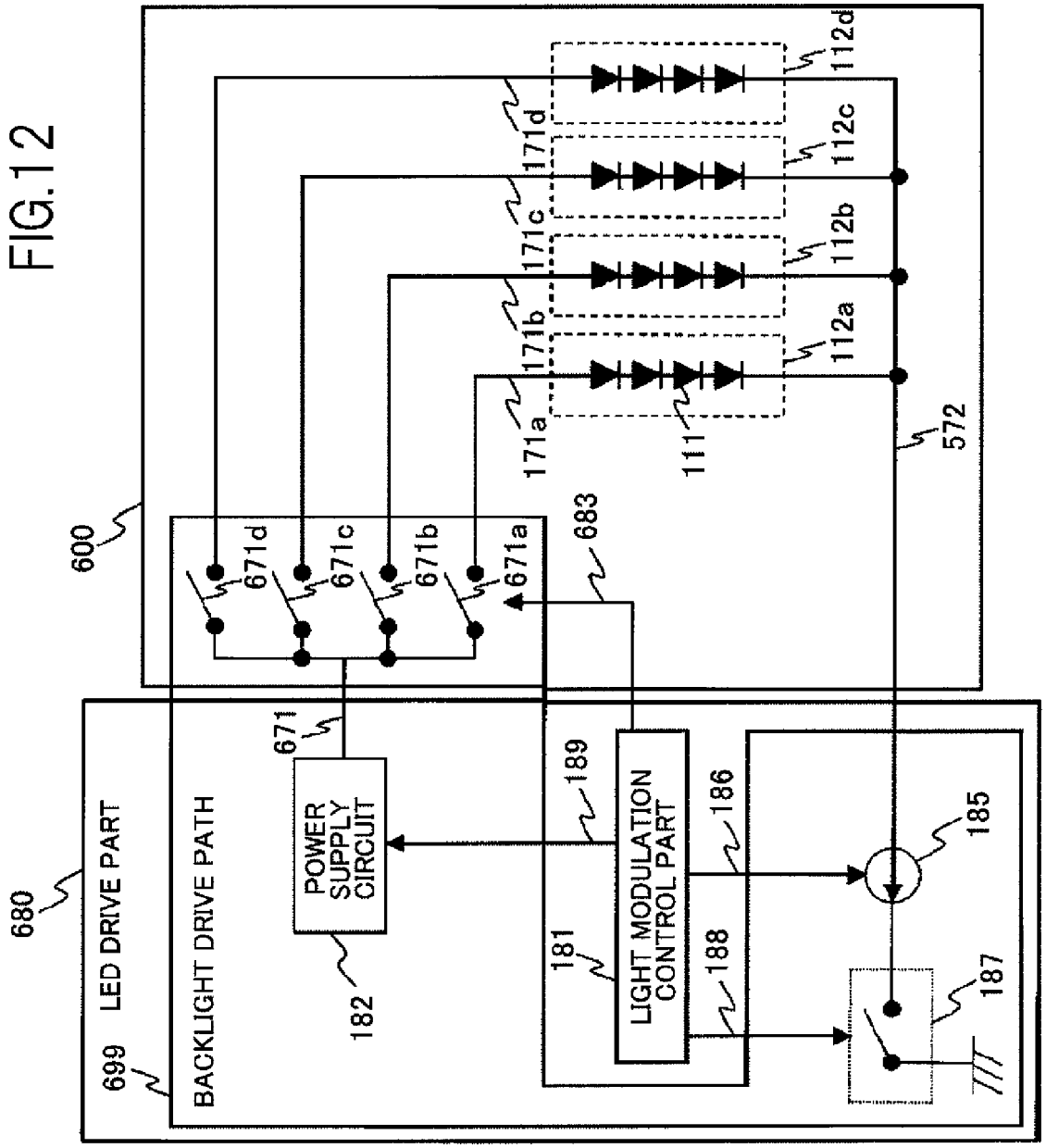
FIG. 12 is a diagram for illustrating in detail an LED drive part according to a sixth embodiment of the present invention.

FIG. 12 is a diagram for illustrating in detail an LED drive part 680 according to a sixth embodiment of the present invention.

In the fifth embodiment of the present invention described with reference to FIG. 11, the first switches 571*a*, 571*b*, 571*c*, and 571*d* are provided on the LED drive part 580. On the contrary, the sixth embodiment to be described with reference to FIG. 12 is different in that first switches 671*a*, 671*b*, 671*c*, and 671*d* are provided on an LED substrate 600, on which the LED chains are also provided, and an LED chain selection signal 683 from the light modulation control part 181 is sent to the first switches 671*a*, 671*b*, 671*c*, and 671*d* on the LED substrate 600. For the rest, the sixth embodiment is substantially similar to the fifth embodiment, and therefore a description of the overlapping parts is omitted.

That is, in the display device according to the sixth embodiment, the first switches 671*a*, 671*b*, 671*c*, and 671*d* constituting a backlight drive path 699 are provided on the LED substrate 600 which also includes the LED chains 111 provided thereon.

In general, the LED control part and the backlight part on which the LED chains are provided are formed on separate substrates, and those substrates are connected to each other via a cable or the like. Here, a large amount of current flows through the anode signal 671 or the cathode signal 572 described above for turning on the LED chains. For this reason, a cable for the anode signal 671 or the cathode line 572 is required to be formed of a relatively expensive member capable of resisting the large current.

On the other hand, the amount of current flowing into the first switches 671*a*, 671*b*, 671*c*, and 671*d*, to which the LED chain selection signal 683 is sent, is not so large as compared to the current for turning on the LEDs. Therefore, a relatively inexpensive member with low current capacity may be employed.

Therefore, according to the configuration of the display device according to the sixth embodiment, in which the first switches 671*a*, 671*b*, 671*c*, and 671*d* are provided on the LED substrate 600, there may be obtained a significant effect, in addition to the effect obtained in the first embodiment, that the display device of the present invention may be formed at lower cost.

It should be noted that FIG. 12, which is a diagram illustrating the LED drive part in the display device according to the sixth embodiment described above, illustrates an example of the circuit in which the cathode signal 572 is shared in common by the LED chains as in the fourth embodiment. However, the present invention is not limited thereto, and the anode signal 171 may be shared in common by the LED chains as in the first embodiment.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A backlight device, comprising:

a backlight including a plurality of light sources; and a backlight control part for controlling the backlight, wherein:

the backlight includes a plurality of divided areas, and light sources disposed in each of the plurality of divided areas are chain-connected;

the backlight control part comprises at least one backlight control means for controlling turning on and off of the backlight which includes the plurality of divided areas, with respect to the each of the plurality of divided areas;

the at least one backlight control means comprises:

selection means for selecting one of the plurality of divided areas; and at least one backlight drive path; and the selection means selects the one of the plurality of divided areas in a time division manner, and the light sources of the one of the plurality of divided areas are driven by sharing the at least one backlight drive path in common;

wherein:
the backlight control part comprises a plurality of backlight drive paths;
each of the plurality of backlight drive paths has the light sources of the plurality of divided areas connected thereto;
each of the plurality of backlight drive paths comprises means for controlling the light sources of each of different divided areas exclusively in each time;
the light sources of the one of the plurality of divided areas are controlled by different backlight drive paths in the time division manner;
the backlight device has the plurality of divided areas of the backlight which is divided in one of a longitudinal direction, a lateral direction, and a longitudinal direction and a lateral direction, and performs a scanning backlight (backlight scrolling) driving for sequentially turning on and off the each of the plurality of divided areas of the backlight which is divided in one of the longitudinal direction and the lateral direction; and
each backlight control means is connected to the light sources of the plurality of divided areas in which the backlight is turned on and off at different timings, to thereby control the light sources of the each of the plurality of divided areas in the time division manner.

2. The backlight device according to claim 1, wherein a number of the backlight drive paths is smaller than a number of the divided areas to which the backlight drive paths are connected.

3. The backlight device according to claim 1, wherein the plurality of light sources comprise light emitting diodes.

4. The backlight device according to claim 3, wherein the light emitting diodes are controlled in light emission amount through one of pulse width modulation and adjustment in current amount to be supplied thereto.

5. The backlight device according to claim 4, wherein the backlight device employs an area light modulation technology in which the plurality of divided areas of the backlight are required to be variable in light emission amount.

6. The backlight device according to claim 1, wherein the backlight control part is provided on a substrate which is disposed perpendicularly to the plurality of backlight drive paths.

7. The backlight device according to claim 1, wherein the plurality of divided areas of the backlight are controlled in a lighting mode switched between a first lighting mode in which the plurality of divided areas of the backlight are controlled to be turned on and off in the time division manner and a second lighting mode in which all the plurality of divided areas of the backlight are controlled to be turned on and off simultaneously.

8. The backlight device according to claim 7, wherein the first lighting mode and the second lighting mode are different from each other in current amount to be supplied to the plurality of light sources.

9. A display device, comprising:
a display panel including a plurality of pixels arrayed thereon, for controlling a light transmission amount; and
the backlight control part according to claim 1.

* * * * *